(12) United States Patent
Irvine et al.

(10) Patent No.: US 12,208,453 B2
(45) Date of Patent: Jan. 28, 2025

(54) CONTROLLING SPRING BACK OF A SHEET OF MATERIAL FOLLOWING MACHINING OPERATIONS

(71) Applicant: The Boeing Company, Chicago, IL (US)

(72) Inventors: Garth Tristan Irvine, Winnipeg (CA); Claudio Zubin, Winnipeg (CA); Darren G. Mitchell, LaSalle (CA)

(73) Assignee: The Boeing Company, Chicago, IL (US)

( * ) Notice: Subject to any disclaimer, the term of this patent is extended or adjusted under 35 U.S.C. 154(b) by 979 days.

(21) Appl. No.: 17/199,353

(22) Filed: Mar. 11, 2021

(65) Prior Publication Data

US 2021/0197293 A1    Jul. 1, 2021

Related U.S. Application Data

(63) Continuation of application No. 16/297,573, filed on Mar. 8, 2019, now abandoned.

(51) Int. Cl.
*B23B 39/28* (2006.01)
*B23B 35/00* (2006.01)
*B23Q 3/06* (2006.01)

(52) U.S. Cl.
CPC .............. *B23B 39/28* (2013.01); *B23Q 3/069* (2013.01); *B23B 2215/04* (2013.01);
(Continued)

(58) Field of Classification Search
CPC ....... B23B 47/00; B23B 47/287; B23B 39/28; B23B 2250/00; B23B 2270/08;
(Continued)

(56) References Cited

U.S. PATENT DOCUMENTS 3,587,391 A * 6/1971 Pitts et al. ............. B23Q 3/069
                                                       408/72 R
3,877,833 A * 4/1975 Thornton ................ B23B 51/05
                                                        408/195

(Continued)

FOREIGN PATENT DOCUMENTS

CN          1593823 A      3/2005
CN        107107290 A      8/2017
(Continued)

OTHER PUBLICATIONS

European Patent Office Communication, dated Mar. 28, 2023, regarding Application No. EP20160452.7, 4 pages.

(Continued)

*Primary Examiner* — Nicole N Ramos

(74) *Attorney, Agent, or Firm* — Yee & Associates, P.C.

(57) ABSTRACT

A machining system configured to reduce spring back following machining operations comprising a machining tool and a spring back control system. The spring back control system comprises a number of force generators and a number of force loaded members coupled to the number of force generators, each force loaded member of the number of force loaded members comprising a material contact surface. The material contact surface is a roller, wherein the machining tool is independently moveable relative to the spring back control system.

20 Claims, 15 Drawing Sheets

(52) U.S. Cl.
CPC ....... *B23B 2250/00* (2013.01); *B23B 2270/08* (2013.01); *Y10T 408/5623* (2015.01)

(58) Field of Classification Search
CPC .... B23B 2215/04; B23Q 3/069; B23Q 3/002; Y10T 408/56245; Y10T 408/56253
See application file for complete search history.

(56) References Cited

U.S. PATENT DOCUMENTS

| | | | | |
|---|---|---|---|---|
| 4,212,570 | A | | 7/1980 | Larsson |
| 4,251,174 | A | * | 2/1981 | Satler ................. B23C 1/06 409/137 |
| 4,304,512 | A | * | 12/1981 | Vierstraete ............. B23Q 3/002 83/939 |
| 4,386,532 | A | * | 6/1983 | Benjamin ................ B25J 13/08 901/46 |
| 4,599,018 | A | * | 7/1986 | Woods .................. B23B 41/006 408/1 R |
| 4,601,619 | A | * | 7/1986 | Stinnett .................. B23Q 3/002 D15/127 |
| 4,749,314 | A | * | 6/1988 | LeBlond .................... B26F 1/16 83/454 |
| 5,299,894 | A | * | 4/1994 | McCowin .......... B23Q 11/1084 408/72 R |
| 5,848,859 | A | * | 12/1998 | Clark ................... G05B 19/404 901/41 |
| 5,876,156 | A | | 3/1999 | Yamaura et al. |
| 6,514,018 | B2 | | 2/2003 | Martinez et al. |
| 7,073,989 | B2 | | 7/2006 | Erickson et al. |
| 7,252,462 | B2 | | 8/2007 | Suzuki et al. |
| 7,404,512 | B2 | * | 7/2008 | Baumann ............. B23K 20/126 228/2.1 |
| 7,476,065 | B2 | * | 1/2009 | Suzuki ............... B23Q 17/2233 700/169 |
| 9,079,270 | B2 | * | 7/2015 | Kato .................. B23K 20/1245 |
| 10,010,968 | B2 | * | 7/2018 | Lambert ............ B23K 20/1205 |
| 2001/0024600 | A1 | * | 9/2001 | Yunoki ................ H05K 3/0047 408/199 |
| 2003/0082019 | A1 | | 5/2003 | Kuchta |
| 2005/0092817 | A1 | | 5/2005 | Baumann et al. |
| 2008/0084018 | A1 | | 4/2008 | Baumann et al. |
| 2013/0255884 | A1 | * | 10/2013 | Baumann ................ B32B 38/18 228/2.1 |
| 2017/0080538 | A1 | | 3/2017 | Belotti |
| 2017/0259386 | A1 | | 9/2017 | Kienholz et al. |
| 2020/0282469 | A1 | | 9/2020 | Irvine et al. |

FOREIGN PATENT DOCUMENTS

| | | | |
|---|---|---|---|
| DE | 3733534 | A1 * | 4/1987 |
| EP | 0010043 | A1 | 4/1980 |
| JP | S6281535 | U | 4/1987 |
| JP | H0570814 | U | 3/1993 |
| JP | H0642039 | U | 2/1994 |
| WO | 2005042208 | A2 | 5/2005 |
| WO | 2015176753 | A1 | 11/2015 |

OTHER PUBLICATIONS

China National Intellectual Property Administration First Notification of Office Action, dated Apr. 20, 2024, regarding CN Application No. 2020100543304, 15 pages.
European Patent Office (EPO) Office Action, dated Feb. 27, 2024, regarding European Application No. 20160452.7, 4 pages.
Office Action, dated Aug. 4, 2020, regarding U.S. Appl. No. 16/297,573, 12 pages.
European Search Report and Written Opinion, dated Sep. 3, 2020, regarding EP Application No. 20160452.7, 7 pages.
Final Office Action, dated Jan. 11, 2021, regarding U.S. Appl. No. 16/297,573, 7 pages.
Japanese Patent Office Action, dated Mar. 12, 2024, regarding JP Patent Application No. 2020-026809, 6 pages.
Chinese Patent Office Action, dated Sep. 7, 2024, regarding CN Patent Application No. 2020100543304, 11 pages.
Japanese Patent Office Action, dated Aug. 27, 2024, regarding JP Patent Application No. 2020-026809, 11 pages.

* cited by examiner

CONTROLLING SPRING BACK OF A SHEET OF MATERIAL FOLLOWING MACHINING OPERATIONS

CROSS-REFERENCE TO RELATED APPLICATION

This application is a continuation of U.S. patent application Ser. No. 16/297,573 filed Mar. 8, 2019, which is incorporated in its entirety herein by reference.

BACKGROUND INFORMATION

1. Field

The present disclosure relates generally to machining operations on sheets, and more specifically to controlling spring back of a sheet of material following machining operations.

2. Background

During manufacturing of sheet components, machining operations, such as drilling, milling, countersinking, or any other desirable machining operation may be performed on a sheet of material. The initial machining force from the drill bit on an unsupported portion of a sheet and the resulting spring back of the sheet may result in less than desired hole quality. The initial machining force from the drill bit and the resulting spring back of the sheet can undesirably affect the drill bit, including potentially breaking the drill bit.

Therefore, it would be desirable to have a method and apparatus that takes into account at least some of the issues discussed above, as well as other possible issues.

SUMMARY

An illustrative embodiment of the present disclosure provides a method of controlling spring back of a sheet of material following a machining operation using a machining system. A compression force is applied to the sheet using a spring back control system of the machining system. The spring back control system comprises a number of force generators coupled to a number of force loaded members in contact with a surface of the sheet to form a region of applied compressive force. Each force loaded member of the number of force loaded members comprises a material contact surface in contact with the surface of the sheet. Each material contact surface comprises a roller. A machining operation is completed through the region of the surface of the sheet using a machining tool while the compression force is applied to the sheet. The machining tool is moved relative to the surface of the sheet while maintaining contact of each material contact surface of each of the number of force loaded members with the surface of the sheet. Each roller is rolled across the surface of the sheet as the machining tool is moved relative to the surface of the sheet.

Another illustrative embodiment of the present disclosure provides a machining system configured to reduce spring back following a machining operation. The machining system comprises a machining tool, and a spring back control system comprising a number of force generators and a number of force loaded members coupled to the number of force generators. Each force loaded member of the number of force loaded members is connected to a material contact surface. The material contact surface is a roller, and the machining tool is independently moveable relative to the spring back control system.

A further illustrative embodiment of the present disclosure provides a machining system configured to reduce spring back following a machining operation. The machining system comprises a number of linear force generators, a number of force loaded members coupled to the number of linear force generators, and a machining tool independently moveable relative to the number of linear force generators. The number of force loaded members are configured to apply compression force to form a region of applied compressive force. Each force loaded member of the number of force loaded members is a roller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
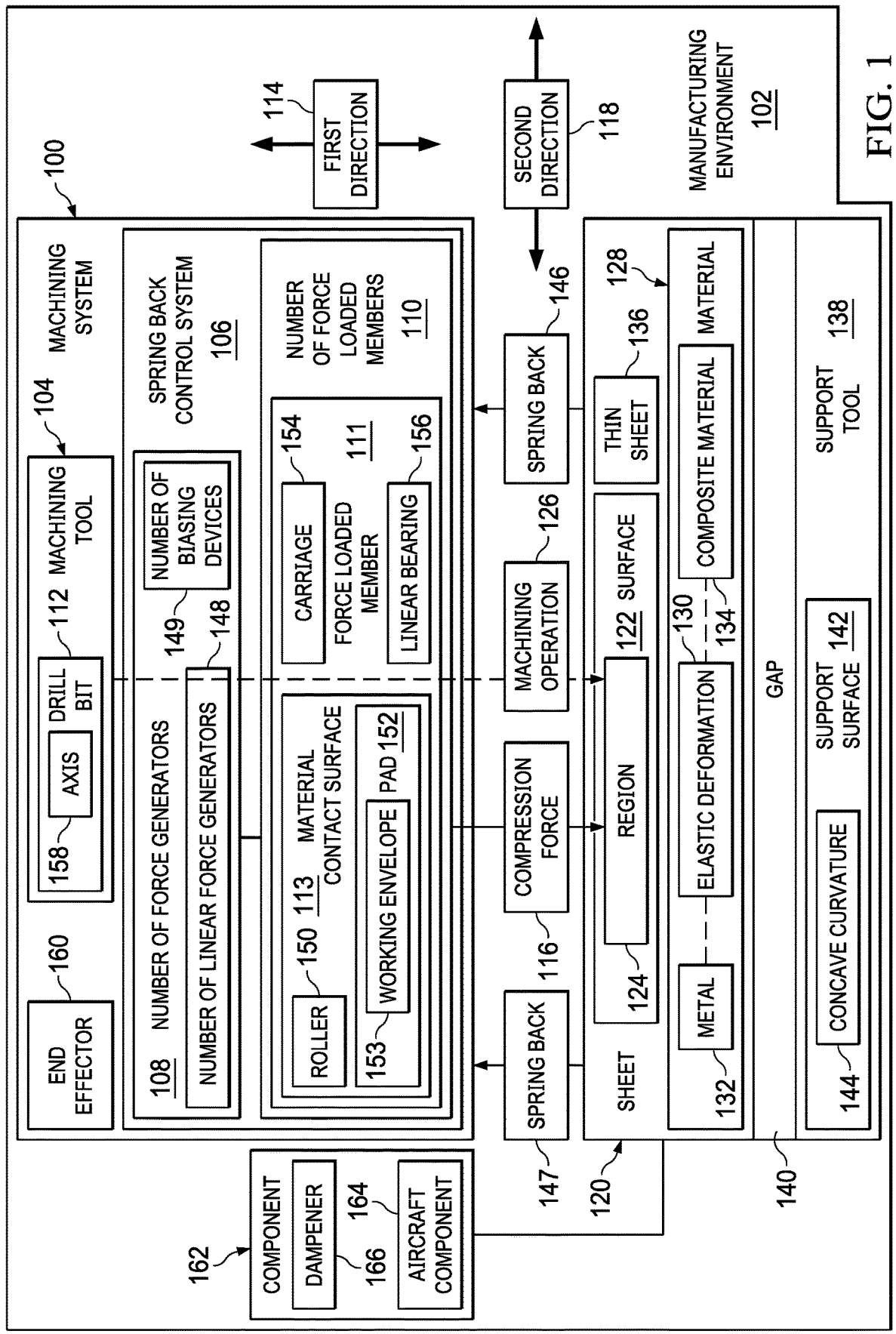
FIG. 1 is an illustration of a block diagram of a manufacturing environment in which a machining system configured to reduce spring back following a machining operation is utilized in accordance with an illustrative embodiment.

The illustrative embodiments recognize and take into account one or more different considerations. The illustrative embodiments recognize and take into account that prior to machining the sheet, the sheet is restrained against a backing plate style support tool. Often, the sheet is restrained at the periphery, leaving the remainder of the sheet unrestrained such that the restraint does not inhibit processing. While the periphery of sheet is restrained, the remainder of the sheet may bend such that portions of the sheet are not in contact with the support surface of the support tool. The portions of the sheet not in contact with the support surface are unsupported. While the periphery of the sheet is restrained against the support tool, a machining operation is performed on a portion of the sheet. The portion of the sheet to be machined may not be contacting the support tool and may be unsupported.

The illustrative embodiments recognize and take into account that performing machining operations on an unsupported portion of the sheet results in spring back. For example, when using a conventional drill system to drill holes, the drill bit initially makes contact with the unsupported surface of the sheet and applies pressure to the sheet. The pressure, or machining force, applied from the drill bit initially causes the sheet to compress against the support tool prior to penetrating through the sheet. Once the sheet is completely penetrated, the elastic energy causes the sheet to rapidly spring back to its free state. This spring back of the sheet is uncontrolled.

The sheet is pushed by the machining force of the drill bit in the direction of the support tool during the machining operation. After the drill bit passes through the sheet, the sheet is no longer subjected to the pushing machining force of the drill bit, and the sheet springs back to its original location.

The illustrative embodiments recognize and take into account that a support tool desirably mirrors the shape of the sheet. The illustrative embodiments recognize and take into account that a support tool may not precisely mirror the shape of the sheet over the entirety of the support tool. The illustrative embodiments recognize and take into account that the support surface of the support tool may be non-planar to support the sheet. The illustrative embodiments recognize and take into account that restraining a sheet on a support tool may result in a gap between the support surface and the sheet.

The illustrative embodiments recognize and take into account that in some examples the support surface of the support tool may be non-planar to support the sheet. In some illustrative examples, the non-planar support tool surface may be concave. When the support surface is non-planar, restraining the periphery of sheet causes the remainder of the sheet to bend such that portions of the sheet are not in contact with the support surface of the support tool. The illustrative embodiments recognize and take into account that a combination of the shape of the sheet and the shape of the support tool may cause gaps between the sheet and the support tool. The illustrative embodiments recognize and take into account that a gap may occur even when potential spring back energy is present in the sheet.

The illustrative embodiments recognize and take into account that performing machining operations on an unsupported portion of the sheet may result in undesirable locations for the machining operations. The illustrative embodiments recognize and take into account that it may be desirable for the sheet to contact the support surface for desirable positioning of features created during the machining operations.

The illustrative embodiments also recognize and take into account that to reduce spring back following a machining operation, a sheet of material may be tacked to a support tool using a temporary adhesive. However, adhesive residue may transfer to machining tools, such as drill bits. Adhesive residue on machining tools may undesirably affect at least one of the life of the machining tools, or the quality of the manufactured component. For example, adhesive residue may undesirably affect the quality of drilled holes in a manufactured component. The illustrative embodiments recognize and take into account that applying an adhesive adds time and cost to the manufacturing process.

Additionally, an adhesive used to hold a sheet of material to a support tool would be qualified for contact use with the type of material of the sheet as well as the material of the support tool. It would be undesirable to use an adhesive that would damage either the material of the sheet or the material of the support tool. Depending upon the material of the sheet, there may be a limited quantity of qualified adhesives.

In some manufacturing operations, vacuum is applied to a sheet to hold the sheet against a support tool. However, conventional vacuum plates having vacuum channels around the periphery do not apply vacuum to the center of the sheet where machining operations are performed. Machining operations, such as perforating processes, would diminish the effectiveness of conventional vacuum plates with vacuum channels in the region of machining operations.

The illustrative embodiments recognize and take into account that conventional methods of attempting to reduce spring back include methods of holding the sheet against the support tool. Conventional methods of attempting to reduce spring back include methods of increasing the supported surface of the sheet around the periphery of the sheet.

The illustrative embodiments recognize and take into account that uncontrolled spring back occurs when a sheet is placed into tension by a machining force and the tension is uncontrollably released after a machining tool passes through the sheet and the machining force is no longer applied to the sheet. The illustrative embodiments recognize and take into account that if the release of tension in the sheet were to be controlled, the spring back would be controlled.

The illustrative embodiments provide machining systems and methods for reducing spring back in machining operations. The illustrative embodiments apply a compression force to the surface of the sheet as the machining operation is performed on the surface of the sheet. By applying the compression force, spring back of the sheet following the machining operation is reduced or eliminated. In some illustrative embodiments, a number of biasing devices apply a load to the sheet to deflect the sheet prior to a machining operation such that spring back following the machining operation is reduced to within desirable limits. After removing the compression force, the sheet experiences a controlled spring back to its original shape. At least one of the rate of spring back or the initiation of spring back relative to the machining operation is controlled.

Turning now to FIG. 1, an illustration of a block diagram of a manufacturing environment in which a machining system configured to reduce spring back following a machining operation is utilized is depicted in accordance with an illustrative embodiment. Machining system 100 in manufacturing environment 102 is configured to reduce spring back following a machining operation.

Machining system 100 comprises machining tool 104 and spring back control system 106. Spring back control system 106 comprises number of force generators 108 and number of force loaded members 110 coupled to number of force generators 108. Each force loaded member of number of force loaded members 110 comprises a material contact surface. For example, force loaded member 111 comprises material contact surface 113.

As used herein, a "number of" items means one or more items. For example, a number of force loaded members means one or more force loaded members.

Material contact surface 113 is formed of any desirable material. Material contact surface 113 is configured to not undesirably affect surface 122 of sheet 120. In one example, the shape of material contact surface 113 is selected to not undesirably mar, bend, or mark surface 122 of sheet 120. As another example, the material of material contact surface 113 is selected to not undesirably mar, bend, or mark surface 122 of sheet 120. In another illustrative example, the material of material contact surface 113 is selected to slip relative to surface 122. In another illustrative example, the material of material contact surface 113 is selected to grip and maintain the position of material contact surface 113 relative to surface 122.

Machining tool 104 comprises any desirable type of tool. In some illustrative examples, machining tool 104 comprises a cutting tool. In one illustrative example, machining tool 104 comprises drill bit 112. In other illustrative examples, machining tool 104 may be selected from a blade, a punch, a mill, or any other desirable cutting tool. In other illustrative examples, machining tool 104 may be selected from a joining tool, a welding tool, or any other desirable type of tool.

In some illustrative examples, machining tool 104 is independently moveable relative to spring back control system 106. In some illustrative examples, machining tool 104 is independently moveable relative to number of force generators 108. In one illustrative example, machining tool 104 is independently moveable relative to spring back control system 106 in first direction 114. First direction 114 is parallel to application of compression force 116. Compression force 116 applied by spring back control system 106 to sheet 120 is parallel to first direction 114 and application of force to sheet 120 by machining tool 104. In another illustrative examples, machining tool 104 is independently moveable relative to spring back control system 106 in second direction 118 perpendicular to first direction 114.

When machining tool 104 is independently moveable relative to spring back control system 106, machining tool 104 may be used to perform machining operations such as slotting or countersinking that may involve movement of machining tool 104 in second direction 118. When machining tool 104 is independently moveable relative to spring back control system 106, machining tool 104 may be used to perform multiple machining operation instances without moving spring back control system 106 relative to sheet 120.

Spring back control system 106 provides compression force 116 against sheet 120. Spring back control system 106 provides compression force 116 to surface 122 of sheet 120 to form region 124 of applied compressive force. Machining operations, such as machining operation 126, are performed in region 124. Machining operations take any desirable form including drilling, milling, countersinking, or any other desirable machining operation.

Sheet 120 is formed of material 128. Material 128 takes the form of any desirable material that has elastic deformation 130. During machining operation 126, force applied by machining tool 104 placing sheet 120 in tension until machining tool 104 penetrates sheet 120. In some illustrative examples, material 128 is one of metal 132 or composite material 134. When material 128 is composite material 134, composite material 134 is cured or partially cured.

In some illustrative examples, sheet 120 is referred to as thin sheet 136. Sheet 120 may be referred to as thin sheet 136, as sheet 120 is thin enough to deflect when machining force of machining operation 126 is applied to sheet 120 without compression force 116 applied.

Sheet 120 is restrained against support tool 138. In some illustrative examples, when sheet 120 is restrained against support tool 138, gap 140 is present between portions of sheet 120 and support surface 142 of support tool 138. In some illustrative examples, gap 140 is present due to concave curvature 144 of support surface 142. Gap 140 is not present behind the entirety of sheet 120, but is present behind at least some of the locations where machining operation 126 will be performed.

If machining operation 126 were performed on surface 122 without compression force 116 from spring back control system 106, spring back 146 following machining operation 126 may have an undesirable force. If machining operation 126 were performed on surface 122 without compression force 116 from spring back control system 106, spring back 146 is uncontrolled. By applying compression force 116 to surface 122 as machining operation 126 is performed, spring back 146 following machining operation 126 is reduced. Spring back control system 106 reduces spring back 146 following machining operation 126 to at or below a desired threshold. Specifically, spring back 146 from machining operation 126 when compression force 116 is applied is less than the spring back experienced when compression force 116 is not applied during machining operation 126. In some illustrative examples, spring back 146 following machining operation 126 is eliminated when compression force 116 is applied during machining operation 126.

Compression force 116 applied to surface 122 is sufficient to desirably reduce spring back 146 of sheet 120 following machining operation 126. Compression force 116 is not high enough to cause permanent deformation to sheet 120. In some illustrative examples, compression force 116 is configured to be sufficient to cause sheet 120 to contact support surface 142 of support tool 138 in region 124 of compressive force. Number of force generators 108 are selected to apply a desired amount of compression force 116. In some illustrative examples, number of force generators 108 are removable and interchangeable so that force generators of a desired strength can be introduced to spring back control system 106.

In some illustrative examples, when compression force 116 is applied to surface 122 of sheet 120, sheet 120 deflects towards support surface 142 of support tool 138. When sheet 120 deflects towards support surface 142, gap 140 is reduced. By maintaining compression force 116 following machining operation 126, sheet 120 returns to its original shape in a controlled fashion.

When compression force 116 deflects sheet 120 towards support surface 142, a machining force of machining operation 126 deflects sheet 120 towards support surface 142 less than the deflection by compression force 116. Machining operation 126 is performed on sheet 120 while compression force 116 is applied to sheet 120. After machining tool 104 extends through sheet 120, the machining force is no longer applied to sheet 120 and any deflection of sheet 120 from machining operation 126 results in spring back 146. Spring back 146 is less when compression force 116 is applied. Compression force 116 is removed after machining operation 126 is complete. When compression force 116 is removed, sheet 120 returns to its shape due to elastic deformation 130.

When compression force 116 is removed, spring back 147 of sheet 120 occurs as sheet 120 returns to its original shape. Spring back 147 may also be referred to as a "controlled spring back." At least one of the rate of spring back 147 or the initiation of spring back 147 relative to machining operation 126 is controlled. In some illustrative examples, spring back 147 occurs locally as compression force 116 is removed locally, but compression force 116 is maintained against sheet 120 as compression force 116 moves across sheet 120. In some illustrative examples, spring back 147 occurs for all of sheet 120 as compression force 116 is removed from sheet 120.

Spring back control system 106 applies compression force 116. Number of force generators 108 of spring back control system 106 provide force to number of force loaded members 110 coupled to number of force generators 108. Number of force generators 108 takes any desirable form. In some illustrative examples, number of force generators 108 is number of linear force generators 148. Number of linear force generators 148 is a number of force generators configured to apply a force in a linear direction. Number of linear force generators 148 need not be linear in shape. In some illustrative examples, number of linear force generators 148 comprises at least one of a number of springs or a number of pneumatic cylinders. In some illustrative examples, number of force generators 108 is referred to as number of biasing devices 149. Number of biasing devices 149 provides compression force 116 applied to sheet 120 to reduce spring back 146 occurring from machining operation 126. By applying compression force 116, tension on sheet 120 introduced by machining operation 126 is reduced. By applying compression force 116, sheet 120 moves towards support tool 138. In some illustrative examples, compression force 116 is maintained on sheet 120 as multiple instances of machining operation 126 are performed on sheet 120. In some illustrative examples, compression force 116 is removed from sheet 120 after each instance of machining operation 126.

Each force loaded member of number of force loaded members 110 is associated with a respective force generator of number of force generators 108. In some illustrative examples, multiple force generators of number of force generators 108 are coupled to a single force loaded member of number of force loaded members 110. In some illustrative examples, each force generator of number of force generators 108 is coupled to a single respective force loaded member of number of force loaded members 110.

Number of force loaded members 110 comprises at least one of a number of rollers or a number of pads. Each force loaded member of number of force loaded members 110 comprises a respective material contact surface, material contact surface 113. Each material contact surface 113 is one of roller 150 or pad 152.

In some illustrative examples, when material contact surface 113 is roller 150, roller 150 may remain in contact with surface 122 of sheet 120 as machining system 100 moves in second direction 118. In some illustrative examples, when material contact surface 113 is roller 150, roller 150 may remain in contact with surface 122 of sheet 120 as machining operation 126 is performed at multiple locations of sheet 120.

In some illustrative examples, when material contact surface 113 is pad 152, pad 152 is removed from surface 122 of sheet 120 prior to movement of machining system 100 in second direction 118. In some illustrative examples, when material contact surface 113 is pad 152, machining tool 104 moves relative to pad 152 while machining tool 104 performs machining operation 126. In some illustrative examples, machining tool 104 moves in second direction 118 relative to pad 152 while machining tool 104 performs countersinking, routing, slotting, or any other desirable machining operation.

In some illustrative examples, number of force loaded members 110 and machining tool 104 move in first direction 114 towards surface 122 simultaneously to perform machining operation 126. In some illustrative examples, machining tool 104 moves in first direction 114 to perform machining operation 126 after number of force loaded members 110 contact surface 122 and apply compression force 116.

In some illustrative examples, number of force loaded members 110 includes a plurality of force loaded members. In some of these illustrative examples, number of force loaded members 110 comprises a plurality of pads configured to apply compression force 116 to surface 122 of sheet 120 to form region 124 of applied compressive force. In these illustrative examples, region 124 is substantially between number of force loaded members 110. In these illustrative examples, number of force loaded members 110 are removed from surface 122 prior to moving machining system 100 in second direction 118. In these illustrative examples, number of force loaded members 110 are removed from contact with sheet 120 after dampening spring back 146 from machining operation 126.

In some illustrative examples, number of force loaded members 110 includes a single force loaded member. In some of these illustrative examples, number of force loaded members 110 comprises a single pad, pad 152. In these illustrative examples, number of force loaded members 110 comprises pad 152 configured to form working envelope 153 for machining tool 104. When number of force loaded members 110 comprises pad 152 with working envelope 153, machining tool 104 performs machining operation 126 through working envelope 153. In one illustrative example, machining tool 104 is drill bit 112, and drill bit 112 extends through working envelope 153 to perform machining operation 126 on sheet 120. In some illustrative examples, machining tool 104 may perform machining operation 126 in multiple locations on sheet 120 without moving pad 152.

In some illustrative examples, each of number of force loaded members 110 further comprises linear bearing 154 and carriage 156. In some illustrative examples, when present, linear bearing 154 and carriage 156 restricts movement of number of force loaded members 110 to first direction 114. In some illustrative examples, when present, linear bearing 154 and carriage 156 restricts movement of number of force loaded members 110 in second direction 118. When present, linear bearing 154 and carriage 156 restrict application of compression force 116 to first direction 114.

In some illustrative examples, machining system 100 comprises number of linear force generators 148, number of force loaded members 110 coupled to number of linear force generators 148 and configured to apply compression force 116 to form region 124 of applied compressive force, and machining tool 104 independently moveable relative to number of linear force generators 148 in first direction 114 parallel to number of linear force generators 148. Machining tool 104 is positioned to perform machining operation 126 within region 124.

In some illustrative examples, number of force loaded members 110 is each equidistant from machining tool 104. In one illustrative example, number of force loaded members 110 may be three force loaded members arranged in a triangle. In this illustrative example, machining tool 104 may be centered within the triangle formed by number of force loaded members 110. In another illustrative example, number of force loaded members 110 may be two force loaded members. In this illustrative example, machining tool 104 may be positioned between force loaded members 110. In yet another illustrative example, number of force loaded members 110 may be four force loaded members positioned in a rectangular or square pattern. In this illustrative example, machining tool 104 is centered within the rectangle or square formed by the four force loaded members.

In some illustrative examples, number of force loaded members 110 comprises pad 152 configured to form working envelope 153 for machining tool 104. In these illustrative examples, pad 152 may also be referred to as a "foot". In these illustrative examples, pad 152 may be connected to multiple force generators of number of force generators 108.

In some illustrative examples, machining tool 104 is independently moveable in second direction 118 perpendicular to number of linear force generators 148. When machining tool 104 is independently moveable in second direction 118, machining tool 104 is independently moveable along surface 122 of sheet 120. In some illustrative examples, machining tool 104 is moved in second direction 118 while number of force loaded members 110 contact surface 122 and apply compression force 116. In these illustrative examples, machining tool 104 may be used to form a slot, a channel, a hole larger than the machining tool 104, or any other desirable feature. In some illustrative examples, machining tool 104 comprises drill bit 112 having axis 158 parallel to number of linear force generators 148. In some illustrative examples, machining tool 104 comprises drill bit 112 having axis 158 parallel to first direction 114.

In some illustrative examples, machining system 100 takes the form of end effector 160. In some illustrative examples, end effector 160 is connected to any desirable robotic device, such as a robotic arm.

Machining system 100 performs machining operation 126 on sheet 120 to form component 162. Component 162 is a component of any desirable platform. The platform may be, for example, a vehicle, a mobile platform, a stationary platform, a land-based structure, an aquatic-based structure, or a space-based structure. More specifically, a platform may be a surface ship, a tank, a personnel carrier, a train, a spacecraft, a space station, a satellite, a submarine, an automobile, a power plant, a bridge, a dam, a house, a manufacturing facility, a building, or other suitable platforms. In some illustrative examples, the platform takes the form of an aircraft. In these illustrative examples, component 162 is aircraft component 164.

Component 162 has at least one feature formed by machining tool 104 in machining operation 126. For example, component 162 may have a plurality of slots, a plurality of channels, a plurality of holes, or any other desired feature. In some illustrative examples, component 162 is a perforated component. In some illustrative examples, component 162 takes the form of dampener 166. Dampener 166 may be an acoustic dampener, a pressure dampener, or any other type of dampener. In some illustrative examples, component 162 is a face sheet of a sandwich panel structure. The illustration of manufacturing environment 102 and machining system 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only force loaded member 111 is depicted within number of force loaded members 110, number of force loaded members 110 has any desirable quantity of force loaded members. For example, number of force loaded members 110 may include two, three, four, or more than four force loaded members. Each force loaded member of number of force loaded members 110 comprises a pad or a roller.

As another example, other non-depicted components or systems of machining system 100 may be present in machining system 100. For example, a debris removal system may be present to remove any debris generated by machining operation 126. As another example, utility connections and other components may be present to support machining system 100. As yet another example, material 128 may be another type of material having elastic deformation 130, such as a polymeric material.

Although not depicted, in some illustrative examples, spring back control system 106 may further comprise force adjusters configured to adjust an amount of compression force 116 applied. The force adjusters could be manual or automated.

Additionally, although only end effector 160 is depicted, in some illustrative examples, machining system 100 includes more than one end effector. In some illustrative examples, spring back control system 106 is part of a first end effector while machining tool 104 is a component of a second end effector.

Figure 2:
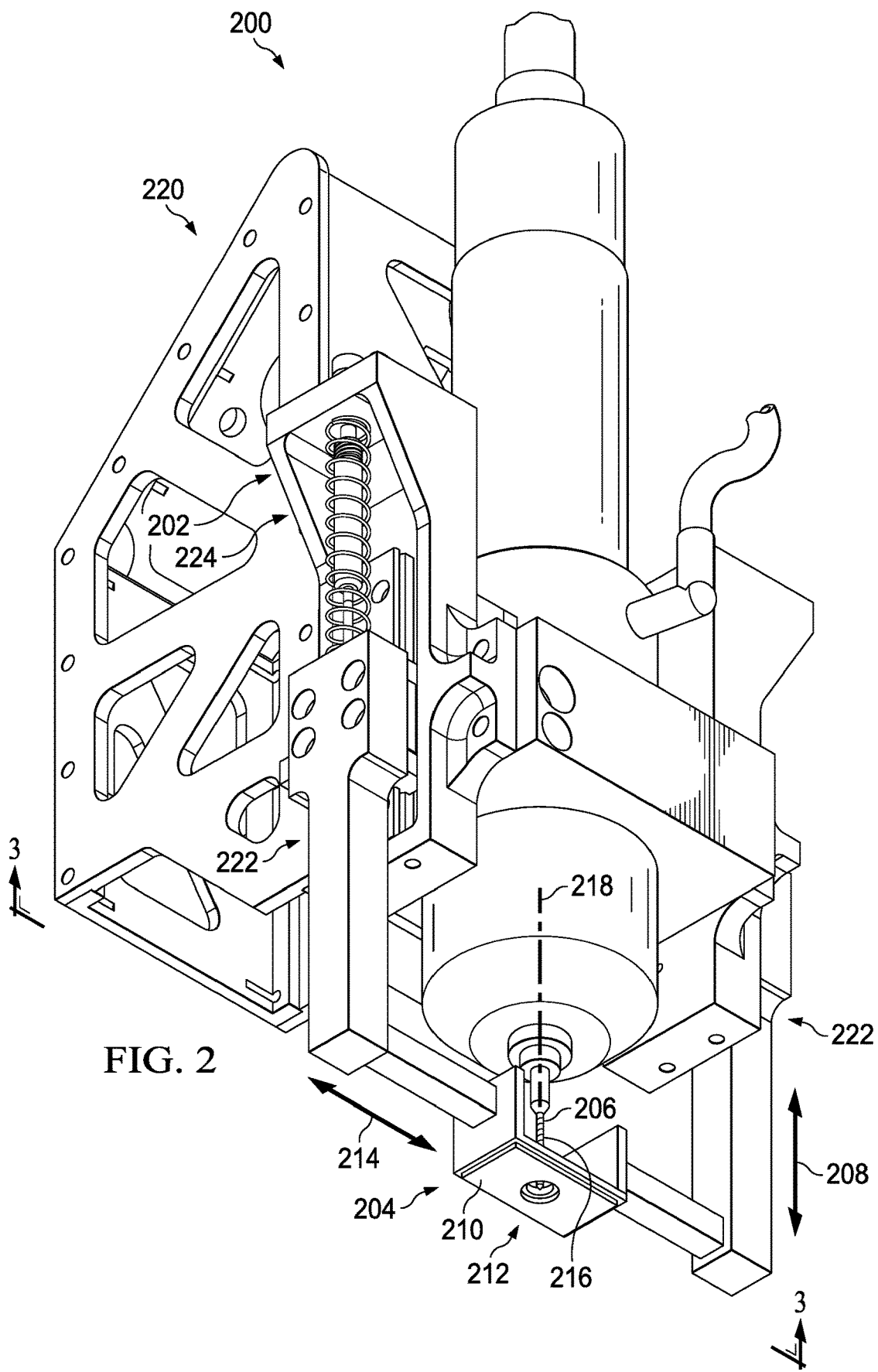
FIG. 2 is an illustration of a perspective view of a machining system configured to reduce spring back following a machining operation in accordance with an illustrative embodiment.

Turning now to FIG. 2, an illustration of a perspective view of a machining system configured to reduce spring back following a machining operation is depicted in accordance with an illustrative embodiment. Machining system 200 is a physical implementation of machining system 100 of FIG. 1. Machining system 200 is configured to reduce spring back following a machining operation. Machining system 200 reduces spring back from a machining operation by applying a compression force to a sheet until the machining operation is completed. When the machining force of the machining operation is removed, spring back following the machining operation is at or below a desired threshold. Controlled spring back of the sheet occurs when the compression force is removed from the sheet.

Machining system 200 comprises number of linear force generators 202, number of force loaded members 204 coupled to number of linear force generators 202, and machining tool 206 independently moveable relative to number of linear force generators 202 in first direction 208 parallel to number of linear force generators 202. Number of force loaded members 204 is configured to apply compression force to form a region of applied compressive force. Machining tool 206 is positioned to perform a machining operation within the region.

As depicted, number of force loaded members 204 is each equidistant from machining tool 206. As depicted, number of force loaded members 204 comprises pad 210 configured to form working envelope 212 for machining tool 206. Number of linear force generators 202 takes any desirable form. In some illustrative examples, number of linear force generators 202 comprises at least one of a number of springs or a number of pneumatic cylinders.

Machining tool 206 is independently moveable in second direction 214 perpendicular to number of linear force generators 202. As depicted, machining tool 206 comprises drill bit 216 having axis 218 parallel to number of linear force generators 202.

As depicted, machining system 200 takes the form of end effector 220. End effector 220 is configured to reduce spring back following a machining operation.

Machining system 200 comprises machining tool 206 and spring back control system 222. Spring back control system 222 comprises number of force generators 224 and number of force loaded members 204 coupled to number of force generators 224. Each force loaded member of number of force loaded members 204 comprises a material contact surface. As depicted, pad 210 of number of force loaded members 204 has material contact surface 226.

In end effector 220, multiple force generators of number of force generators 224 are coupled to a single force loaded member of number of force loaded members 204. In end effector 220, each of number of force generators 224 is coupled to a single force loaded member comprising pad 210.

Figure 3:
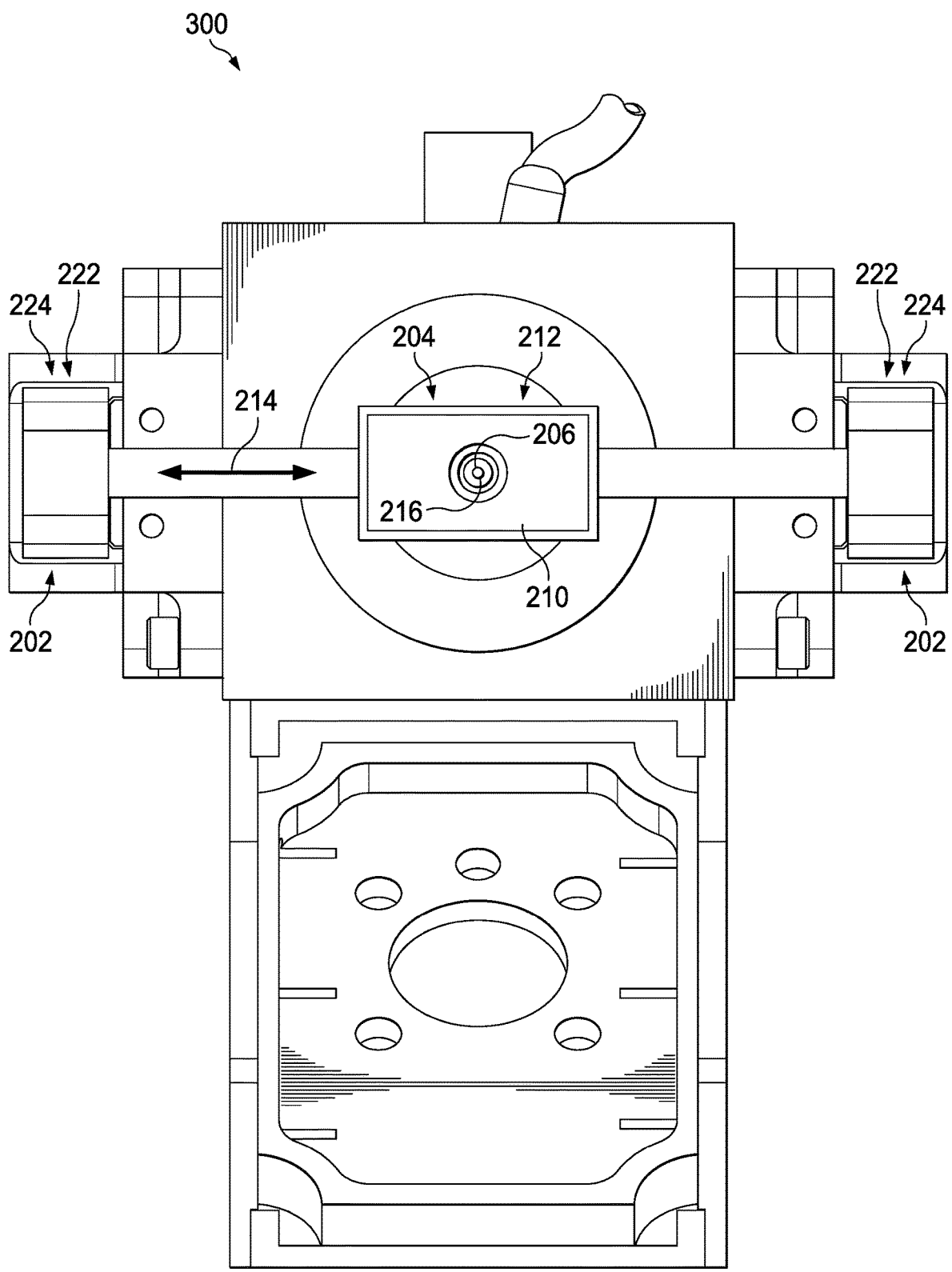
FIG. 3 is an illustration of a bottom view of a machining system configured to reduce spring back following a machining operation in accordance with an illustrative embodiment.

Turning now to FIG. 3, an illustration of a bottom view of a machining system configured to reduce spring back following a machining operation is depicted in accordance with an illustrative embodiment. In view 300, working envelope 212 of pad 210 is visible. As can be seen in view 300, machining tool 206 will move in first direction 208 of FIG. 2 to extend through working envelope 212 to perform a machining operation on a workpiece. In view 300, first direction 208 of FIG. 2 moves into and out of the page.

To reduce spring back following a machining operation using machining tool 206, pad 210 is placed in contact with the surface of a workpiece. A compression force is applied to the workpiece using number of force generators 224 to form a region of applied compressive force. A machining operation will be performed in the region using machining tool 206 while the compression force is applied to the sheet.

Figure 4:
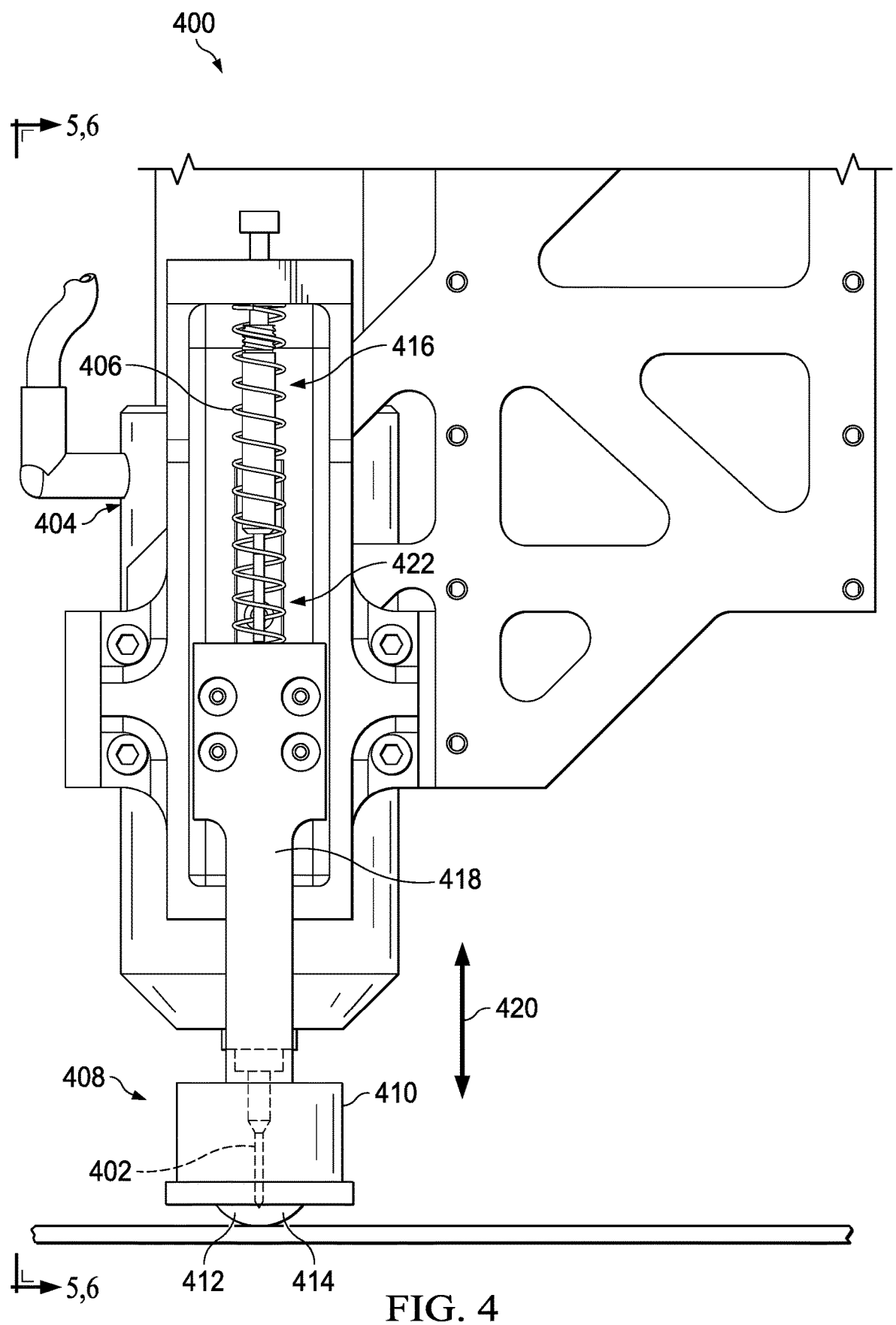
FIG. 4 is an illustration of a side view of a machining system configured to reduce spring back following a machining operation in accordance with an illustrative embodiment.

Turning now to FIG. 4, an illustration of a side view of a machining system configured to reduce spring back following a machining operation is depicted in accordance with an illustrative embodiment. Machining system 400 is a physical implementation of machining system 100 of FIG. 1. Machining system 400 is a second non-limiting example of machining system 100 of FIG. 1. Machining system 400 is configured to reduce spring back following a machining operation.

Machining system 400 comprises machining tool 402 and spring back control system 404. Spring back control system 404 comprises number of force generators 406 and number of force loaded members 408 coupled to number of force generators 406. Each force loaded member of number of force loaded members 408 comprises a material contact surface.

For example, force loaded member 410 of number of force loaded members 408 comprises material contact surface 412. Each material contact surface is one of a roller or a pad. Material contact surface 412 takes the form of roller 414.

As depicted, each of number of force loaded members 408 of machining system 400 comprises a linear bearing and a carriage. For example, force loaded member 410 comprises linear bearing 416 and carriage 418. Linear bearing 416 and carriage 418 restrict movement of force loaded member 410 to first direction 420.

Machining system 400 comprises number of linear force generators 422, number of force loaded members 408 coupled to number of linear force generators 422 and configured to apply a compression force to form a region of applied compressive force, and machining tool 402 independently moveable relative to the number of linear force generators 422 in first direction 420 parallel to the number of linear force generators, machining tool 402 is positioned to perform a machining operation within the region. In some illustrative examples, machining tool 402 is independently moveable in a second direction perpendicular to number of linear force generators 422.

Figure 5:
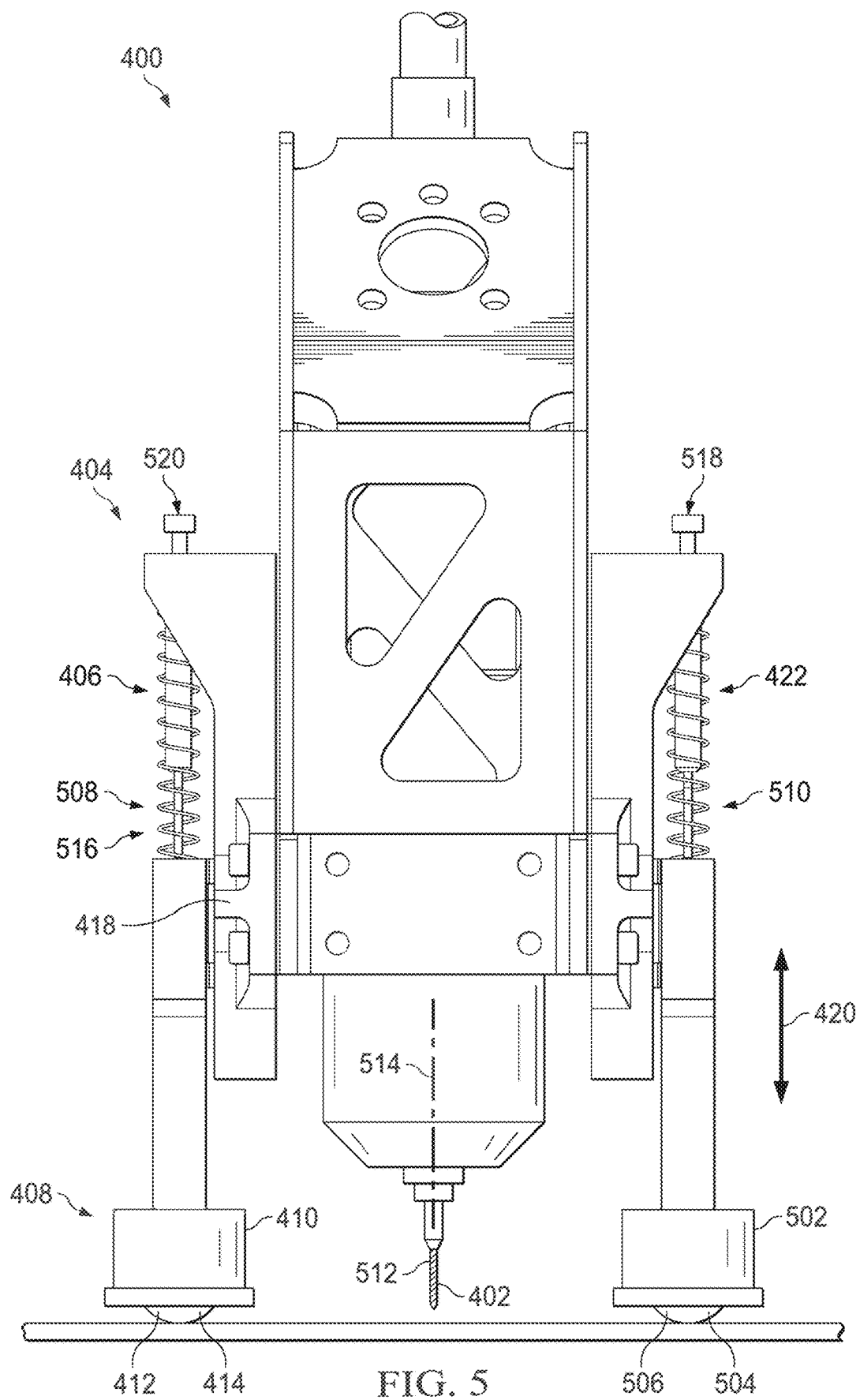
FIG. 5 is an illustration of a front view of a machining system configured to reduce spring back following a machining operation in accordance with an illustrative embodiment.

Turning now to FIG. 5, an illustration of a front view of a machining system configured to reduce spring back following a machining operation is depicted in accordance with an illustrative embodiment. View 500 is a front view of machining system 400 of FIG. 4.

In view 500, force loaded member 502 is visible. Force loaded member 502 of number of force loaded members 408 comprises material contact surface 504. Material contact surface 504 takes the form of roller 506.

In this illustrative example, each force loaded member of number of force loaded members 408 is associated with a respective force generator of number of force generators 406. For example, force generator 508 is associated with force loaded member 410 and force generator 510 is associated with force loaded member 502.

Each of force generator 508 and force generator 510 provides a desirable amount of force to control spring back of a sheet of material following a machining operation. Each of force generator 508 and force generator 510 may be selected based on a desired amount of force. As depicted, number of force generators 406 further comprises force adjuster 518 and force adjuster 520. As depicted, force adjuster 518 and force adjuster 520 may be loosened or tightened to adjust the pre-load for number of force generators 406.

As depicted, machining tool 402 comprises drill bit 512. As depicted, drill bit 512 has axis 514. As depicted, number of force generators 406 takes the form of number of linear force generators 422. As depicted, axis 514 is parallel to number of linear force generators 422. As depicted, machining tool 402 is positioned between roller 414 and roller 506. As depicted, number of force loaded members 408 is each equidistant from machining tool 402. In some illustrative examples, number of force loaded members 408 is not equidistant from machining tool 402.

As depicted, machining tool 402 comprises drill bit 512 having an axis 514 parallel to number of linear force generators 422. In some illustrative examples, machining tool 402 is independently moveable relative to spring back control system 404.

As depicted, number of linear force generators 422 comprises at least one of a number of springs or a number of pneumatic cylinders. As depicted, number of linear force generators 422 comprises number of springs 516.

Figure 6:
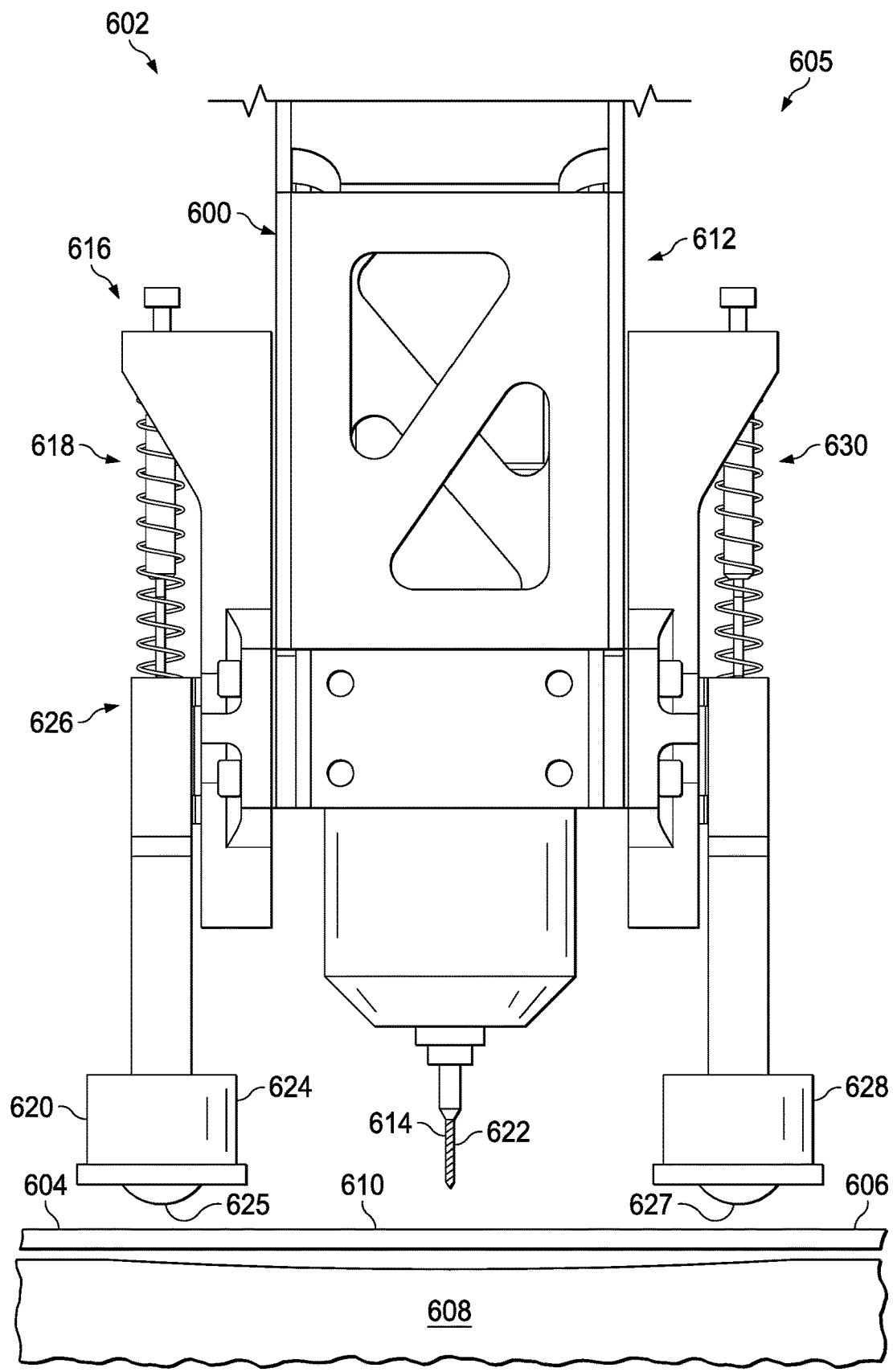
FIG. 6 is an illustration of a front view of a machining system above a sheet in accordance with an illustrative embodiment.

Turning now to FIG. 6, an illustration of a front view of a machining system above a sheet is depicted in accordance with an illustrative embodiment. Machining system 600 is a physical implementation of machining system 100 of FIG. 1. Machining system 600 may be the same as machining system 400 of FIGS. 4-5.

In view 602, machining system 600 is positioned above workpiece 604 in manufacturing environment 605. Workpiece 604 takes the form of sheet 606. Sheet 606 is associated with support tool 608. Sheet 606 is associated with support tool 608 by being restrained relative to support tool 608. Sheet 606 is restrained relative to support tool 608 by securing the periphery (not depicted) of sheet 606 relative to support tool 608. View 602 is of a portion of sheet 606 that will receive a machining operation.

The periphery of sheet 606 will not receive a machining operation. The description of securing periphery is only illustrative, any desirable amount of sheet 606 is restrained against support tool 608. Portion 610 of sheet 606 is not in contact with support tool 608. Portion 610 of sheet 606 is unsupported.

Machining system 600 takes the form of end effector 612. End effector 612 is configured to reduce spring back following a machining operation. Machining system 600 comprises machining tool 614 and spring back control system 616. Spring back control system 616 comprises number of force generators 618 and number of force loaded members 620 coupled to number of force generators 618. Each force loaded member of number of force loaded members 620 comprises a material contact surface. As depicted, each material contact surface is a roller. For example, force loaded member 624 comprises roller 625. As another example, force loaded member 628 comprises roller 627.

As depicted, machining tool 614 comprises drill bit 622. Each force loaded member of number of force loaded members 620 is associated with a respective force generator of number of force generators 618. For example, force loaded member 624 of number of force loaded members 620 is associated with force generator 626 of number of force generators 618. As another example, force loaded member 628 of number of force loaded members 620 is associated with force generator 630 of number of force generators 618.

Prior to performing a machining operation on sheet 606 using drill bit 622, a compression force will be applied to sheet 606 by spring back control system 616. A compression force applied by spring back control system 616 will reduce the spring back of sheet 606 caused by a machining operation on sheet 606. The compression force is applied in anticipation of a spring back of sheet 606.

Figure 7:
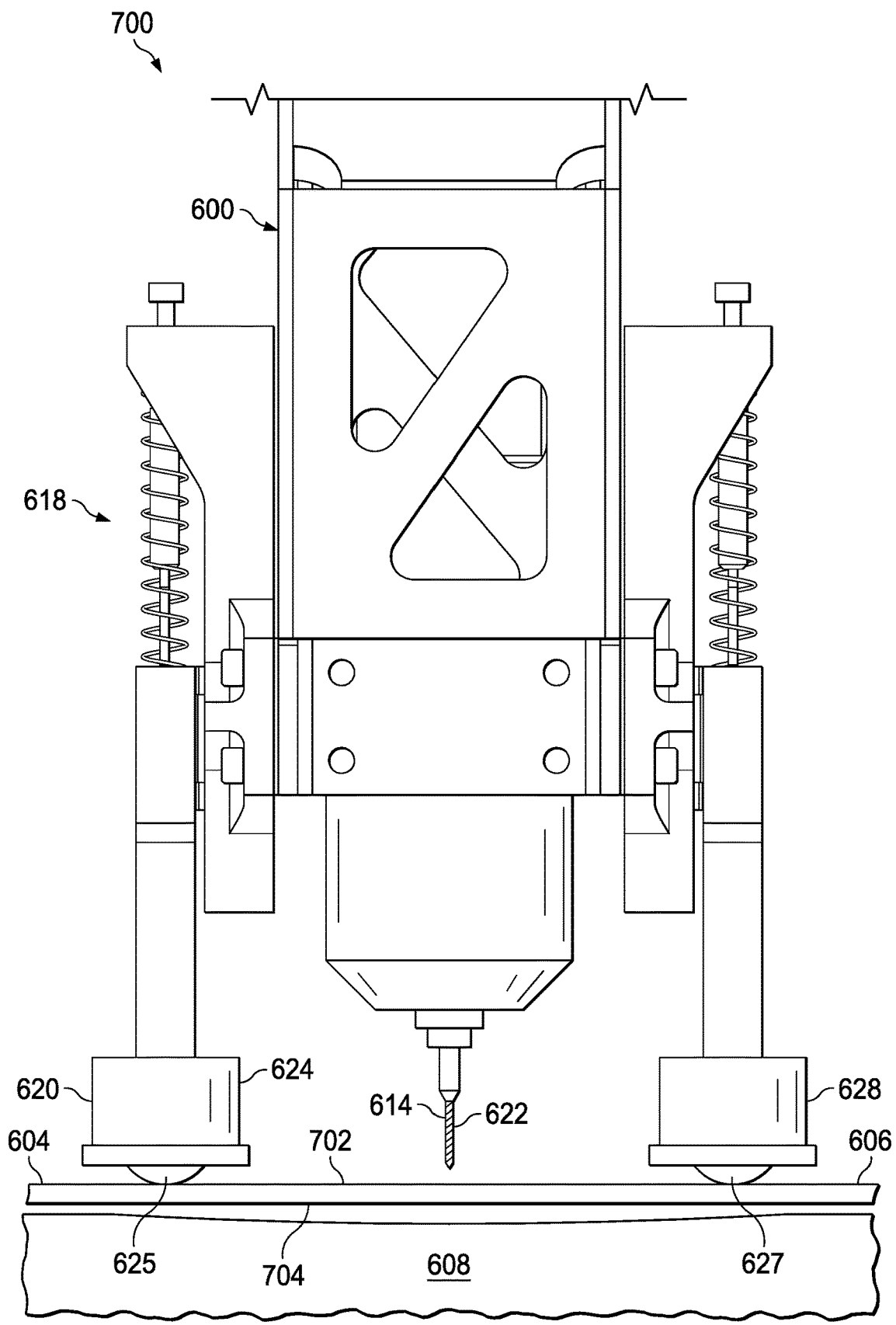
FIG. 7 is an illustration of a front view of force loaded members of a machining system in contact with a sheet in accordance with an illustrative embodiment.

Turning now to FIG. 7, an illustration of a front view of force loaded members of a machining system in contact with a sheet is depicted in accordance with an illustrative embodiment. In view 700, roller 625 and roller 627 are in contact with surface 702 of sheet 606. Machining tool 614 is not in contact with surface 702. In view 700, gap 704 is present between sheet 606 and support tool 608.

In view 700, a compression force is not yet allowed to surface 702. In view 700, roller 625 and roller 627 are in contact with surface 702 but do not yet apply a force to sheet 606.

Figure 8:
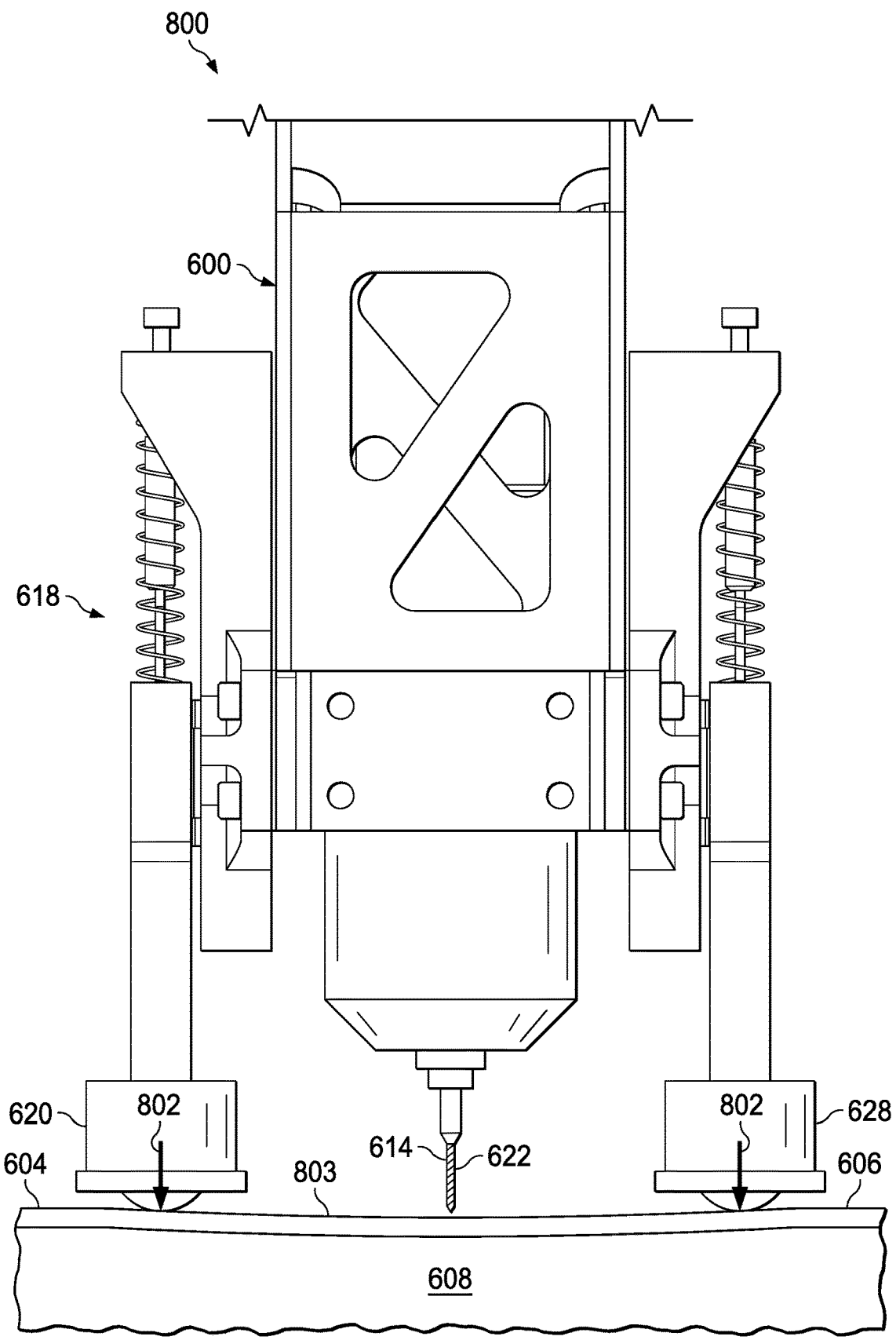
FIG. 8 is an illustration of a front view of force loaded members of a machining system applying a compression force to a sheet in accordance with an illustrative embodiment.

Turning now to FIG. 8, an illustration of a front view of force loaded members of a machining system applying a compression force to a sheet is depicted in accordance with an illustrative embodiment. In view 800, compression force 802 is applied to sheet 606 using number of force generators 618 coupled to number of force loaded members 620 to form region 803 of applied compressive force.

In view 800, compression force 802 deflects sheet 606 towards support tool 608. By deflecting sheet 606 towards support tool 608, sheet 606 is placed into tension. By deflecting sheet 606 towards support tool 608, gap 704 between sheet 606 and support tool 608 is reduced between view 700 of FIG. 7 and view 800. In view 800, no visible gap is present between sheet 606 and support tool 608. However, view 800 is not meant to imply physical or architectural limitations to the manner in which an illustrative embodiment may be implemented. In other illustrative examples, a small gap may still be present after application of compression force 802. Further, support tool 608 may have any desirable contour. Yet further, in some illustrative examples, compression force 802 may not be applied to sheet 606 prior to beginning a machining operation.

Figure 9:
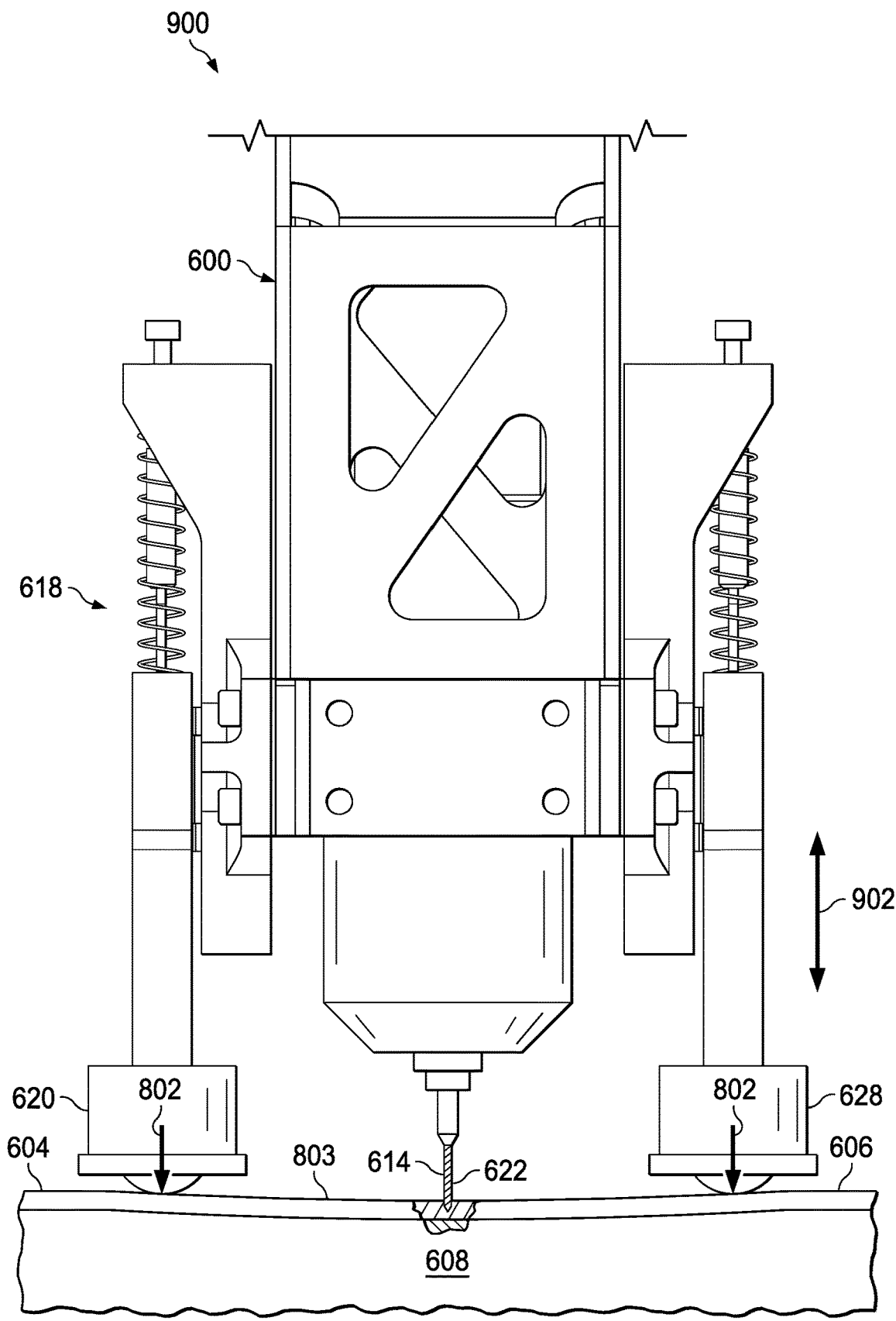
FIG. 9 is an illustration of a cross-sectional view of a machining system performing a machining operation on the sheet in accordance with an illustrative embodiment.

Turning now to FIG. 9, an illustration of a cross-sectional view of a machining system performing a machining operation on the sheet is depicted in accordance with an illustrative embodiment. In view 900, machining tool 614 is performing a machining operation on sheet 606. As depicted, machining tool 614 is drill bit 622 performing a drilling operation on sheet 606. Compression force 802 is applied to sheet 606 as the drilling operation is performed on sheet 606.

Compression force 802 is applied to sheet 606 to form region 803 of applied compressive force. Machining tool 614 performs drilling in region 803.

Machining tool 614 is independently moveable relative to spring back control system 616. More specifically, machining tool 614 is independently moveable relative to number of force generators 618 in first direction 902 parallel to number of force generators 618. Between view 800 and view 900, machining tool 614 has been moved in first direction 902 towards sheet 606.

Figure 10:
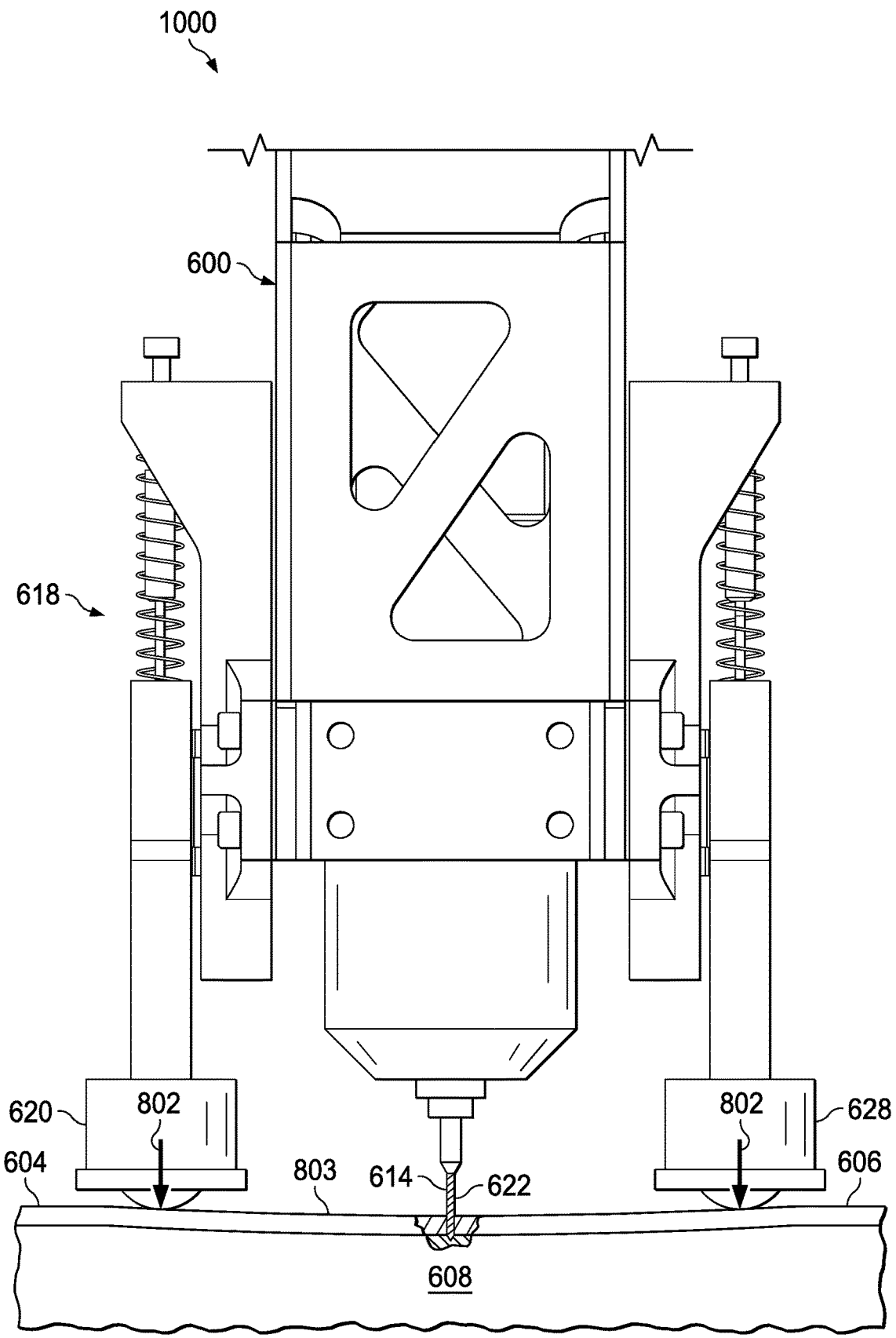
FIG. 10 is an illustration of a cross-sectional view of a machining system performing a machining operation on the sheet in accordance with an illustrative embodiment.

Turning now to FIG. 10, an illustration of a cross-sectional view of a machining system performing a machining operation on the sheet is depicted in accordance with an illustrative embodiment. In view 1000, drill bit 622 has completely perforated sheet 606. In view 1000, drill bit 622 is extending through sheet 606.

In view 1000, compression force 802 is applied to sheet 606. Compression force 802 is applied in region 803 of sheet 606. Due to compression force 802 still being applied to sheet 606, sheet 606 is still in tension. Due to compression force 802, spring back of sheet 606 following the machining operation is reduced. Spring back of sheet 606 following the machining operation under compression force 802 is less than spring back of sheet 606 after a drilling operation without compression force 802. In view 1000, the spring back of sheet 606 after drill bit 622 perforates sheet 606 is not visible. In other illustrative examples, the spring back of sheet 606 after drill bit 622 perforates sheet 606 may be visible.

Figure 11:
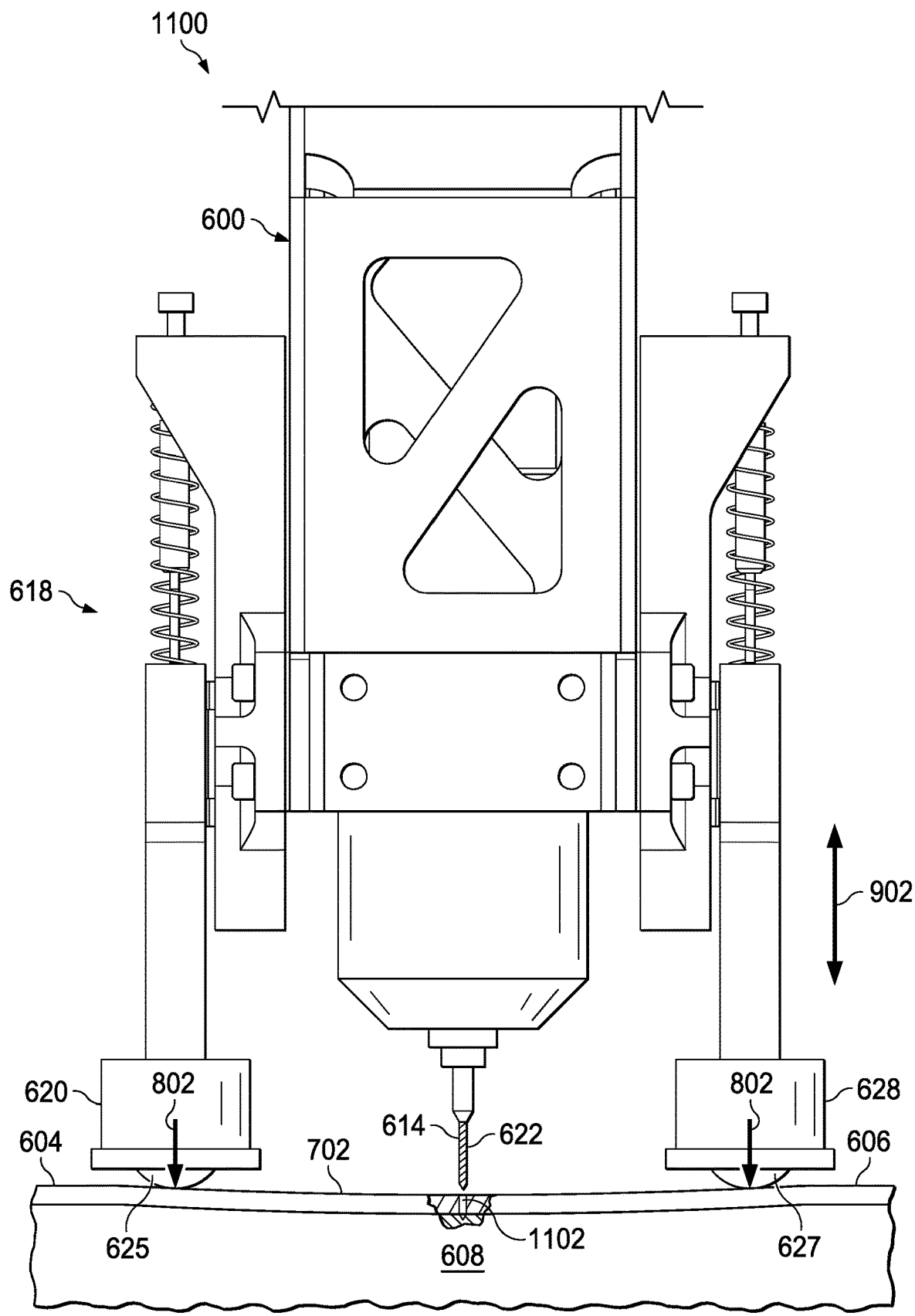
FIG. 11 is an illustration of a cross-sectional view of a machining system performing a machining operation on the sheet in accordance with an illustrative embodiment.

Turning now to FIG. 11, an illustration of a cross-sectional view of a machining system performing a machining operation on the sheet is depicted in accordance with an illustrative embodiment. In view 1100, drill bit 622 has been retracted in first direction 902 from sheet 606. Hole 1102 extends through sheet 606. In view 1100, compression force 802 is maintained on sheet 606. As compression force 802 is removed from sheet 606, tension will be removed from sheet 606. As compression force 802 is removed from sheet 606, spring back will occur in a controlled fashion. For example, at least one of the rate of the spring back or the initiation of spring back relative to machining operation is controlled.

In some illustrative examples, compression force 802 may be maintained on sheet 606 as roller 625 and roller 627 are rolled across surface 702 of sheet 606. In these illustrative examples, compression force 802 is maintained as end effector 612 is moved relative to sheet 606. In some of these illustrative examples, compression force 802 may be maintained as drill bit 622 performs machining operations on several locations of sheet 606.

In other illustrative examples, compression force 802 is removed prior to moving end effector 612 relative to sheet 606. In some of these illustrative examples, compression force 802 is applied prior to each instance of a machining operation and removed after each instance of the machining operation.

Figure 12:
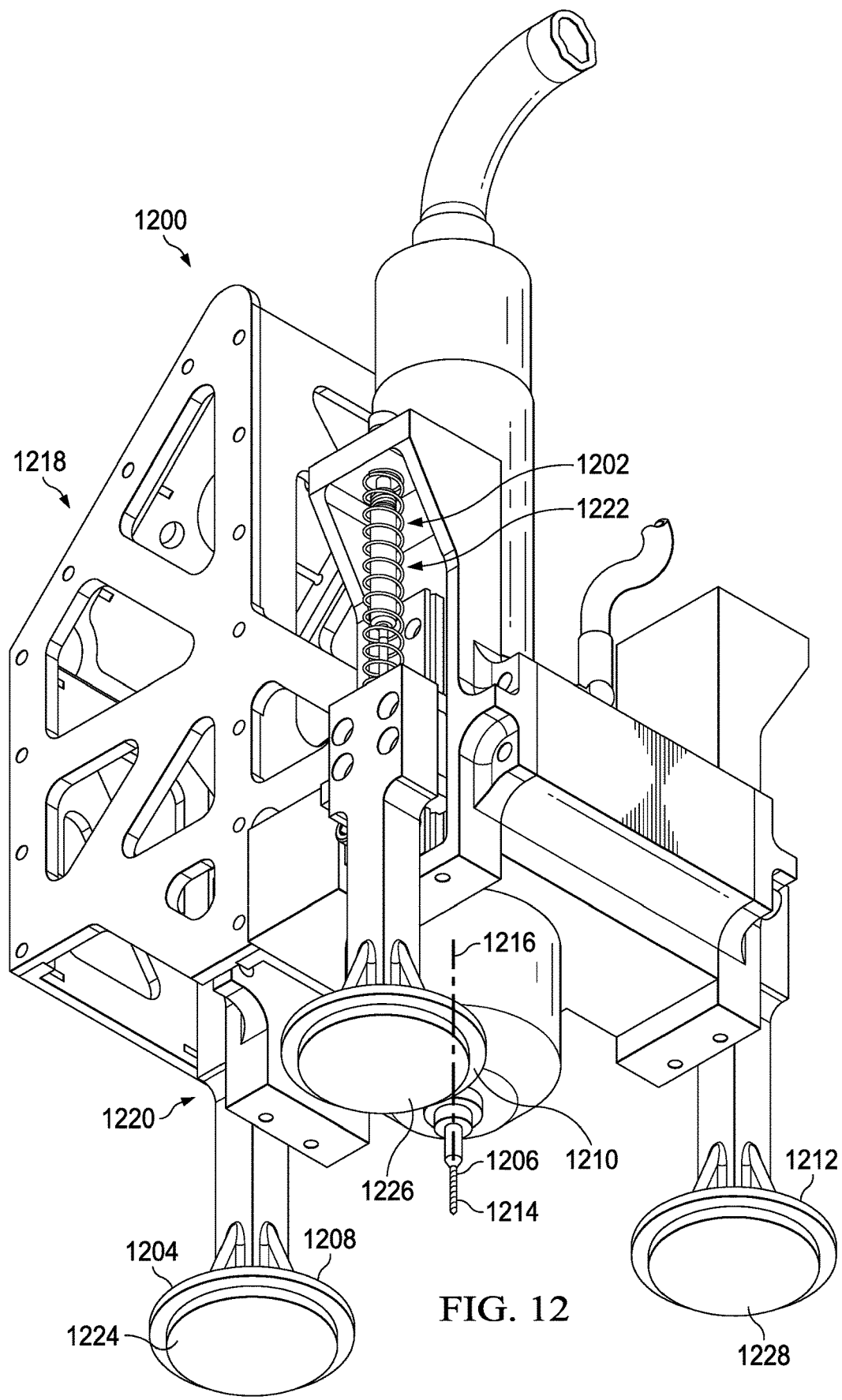
FIG. 12 is an illustration of a perspective view of a machining system configured to reduce spring back following a machining operation in accordance with an illustrative embodiment.

Turning now to FIG. 12, an illustration of a perspective view of a machining system configured to reduce spring back following a machining operation is depicted in accordance with an illustrative embodiment. Machining system 1200 is a physical implementation of machining system 100 of FIG. 1. Machining system 1200 is configured to reduce spring back following a machining operation. Machining system 1200 comprises number of linear force generators 1202, number of force loaded members 1204 coupled to number of linear force generators 1202, and machining tool 1206 independently moveable relative to number of linear force generators 1202 in a first direction parallel to number of linear force generators 1202. Number of force loaded members 1204 is configured to apply compression force to form a region of applied compressive force. Machining tool 1206 is positioned to perform a machining operation within the region.

As depicted, number of force loaded members 1204 is each equidistant from machining tool 1206. As depicted, number of force loaded members 1204 comprises pad 1208, pad 1210, and pad 1212. Number of linear force generators 1202 takes any desirable form. In some illustrative examples, number of linear force generators 1202 comprises at least one of a number of springs or a number of pneumatic cylinders.

Machining tool 1206 is independently moveable in a second direction perpendicular to number of linear force generators 1202. As depicted, machining tool 1206 comprises drill bit 1214 having axis 1216 parallel to number of linear force generators 1202.

As depicted, machining system 1200 takes the form of end effector 1218. End effector 1218 is configured to reduce spring back following a machining operation.

Machining system 1200 comprises machining tool 1206 and spring back control system 1220. Spring back control system 1220 comprises number of force generators 1222 and number of force loaded members 1204 coupled to number of force generators 1222. Each force loaded member of number of force loaded members 1204 comprises a material contact surface. As depicted, pad 1208 of number of force loaded members 1204 has material contact surface 1224. Pad 1210 has material contact surface 1226 and pad 1212 has material contact surface 1228.

In end effector 1218, each force generator of number of force generators 1222 is coupled to a different force loaded member of number of force loaded members 1204. In end effector 1218, each of number of force generators 1222 is coupled to a respective single force loaded member of pad 1208, pad 1210, or pad 1212.

In this illustrative example, pad 1208, pad 1210, and pad 1212 form a triangle. As can be seen in this illustrative example, machining tool 1206 will perform a machining operation on a workpiece within a triangular region of compressive force formed by pad 1208, pad 1210, and pad 1212. As can be seen in this illustrative example, machining tool 1206 will be positioned between pad 1208, pad 1210, and pad 1212.

To reduce spring back following a machining operation using machining tool 1206, pad 1208, pad 1210, and pad 1212 are placed in contact with the surface of a workpiece. A compression force is applied to the workpiece using number of force generators 1222 to form a region of applied compressive force. A machining operation will be performed in the region using machining tool 1206 while the compression force is applied to the sheet.

Figure 13:
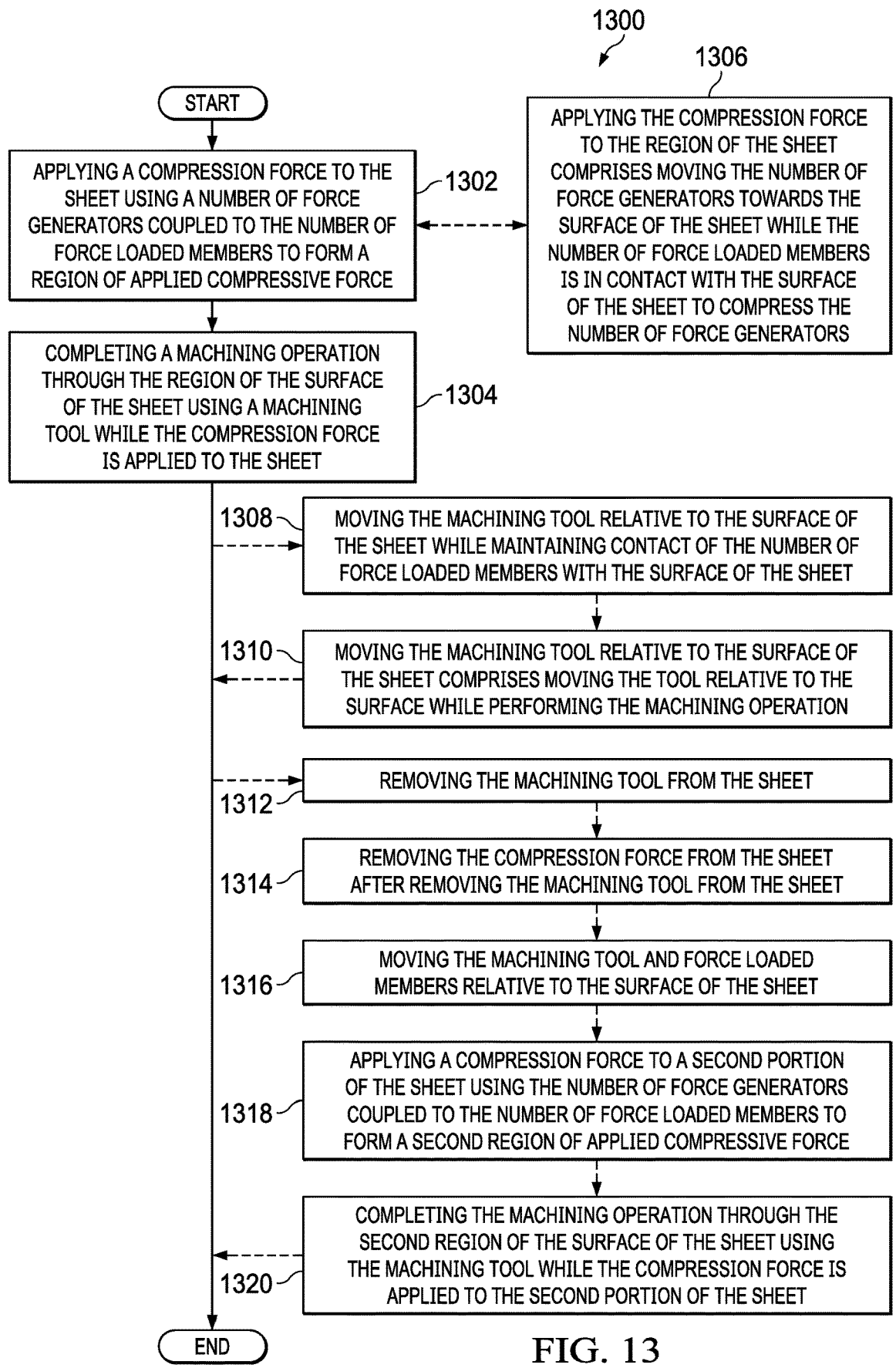
FIG. 13 is an illustration of a flowchart of a method for controlling spring back of a sheet of material following a machining operation using a machining system in accordance with an illustrative embodiment.

Turning now to FIG. 13, an illustration of a flowchart of a method for controlling spring back of a sheet of material following a machining operation using a machining system is depicted in accordance with an illustrative embodiment. Method 1300 may be implemented in manufacturing environment 102 of FIG. 1 using machining system 100. Method 1300 may be implemented using machining system 200 of FIGS. 2 and 3. Method 1300 may be implemented using machining system 400 of FIGS. 4-5. Method 1300 may be implemented in manufacturing environment 605 using machining system 600 of FIGS. 6-11. Method 1300 may be implemented using machining system 1200 of FIG. 12.

Method 1300 applies a compression force to the sheet using a number of force generators coupled to a number of force loaded members in contact with the sheet to form a region of applied compressive force (operation 1302). Each of the force loaded members comprises a respective material contact surface. The material contact surface takes the form of one of a moveable surface or a stationary surface. When the material contact surface takes the form of a moveable surface, material contact surface may be part of a roller. When the material contact surface takes the form of a stationary surface, the material contact surface may be part of a pad.

The number of force generators take any desirable form. In some illustrative examples, the number of force generators are a number of linear force generators.

Method 1300 completes a machining operation through the region of the surface of the sheet using a machining tool while the compression force is applied to the sheet (operation 1304). The machining operation may be drilling, milling, countersinking, or any other desirable form of machining operation. Afterwards, method 1300 terminates.

By completing a machining operation while the compression force is applied, spring back following the machining operation is reduced or eliminated. Controlled spring back of the sheet occurs as compression force is removed from the sheet. By controlling at least one of the rate of the spring back or the timing of the spring back relative to the machining operation, at least one of the quality of the machining features or the life of the machining tool may be increased.

In some illustrative examples, the compression force is applied to the region of the sheet prior to performing the machining operation. In some illustrative examples, the compression force deflects the sheet such that the machining operation is performed on a desired location.

In some illustrative examples, applying the compression force to the region of the sheet comprises moving the number of force generators towards the surface of the sheet while the number of force loaded members is in contact with the surface of the sheet to compress the number of force generators (operation 1306). In some illustrative examples, method 1300 moves the machining tool relative to the surface of the sheet while maintaining contact of the number of force loaded members with the surface of the sheet (operation 1308). In some illustrative examples, moving the machining tool relative to the surface of the sheet while maintaining contact of the number of force loaded members with the surface of the sheet is performed to apply a machining operation to a second location within the region. In some illustrative examples, moving the machining tool relative to the surface of the sheet while maintaining contact of the number of force loaded members with the surface of the sheet is performed when the machining operation is a countersinking operation.

In some illustrative examples, moving the machining tool relative to the surface of the sheet comprises moving the machining tool relative to the surface while performing the machining operation (operation 1310).

In some illustrative examples, method 1300 removes the machining tool from the sheet (operation 1312). The compression force is removed from the sheet (operation 1314). The machining tool and force loaded members are moved relative to the surface of the sheet after removing the machining tool and the compression force from the sheet (operation 1316). A compression force is applied to a second portion of the sheet using the number of force generators coupled to the number of force loaded members to form a second region of applied compressive force (operation 1318). The machining operation is performed through the second region of the surface of the sheet using the machining tool while the compression force is applied to the second portion of the sheet (operation 1320).

Figure 14:
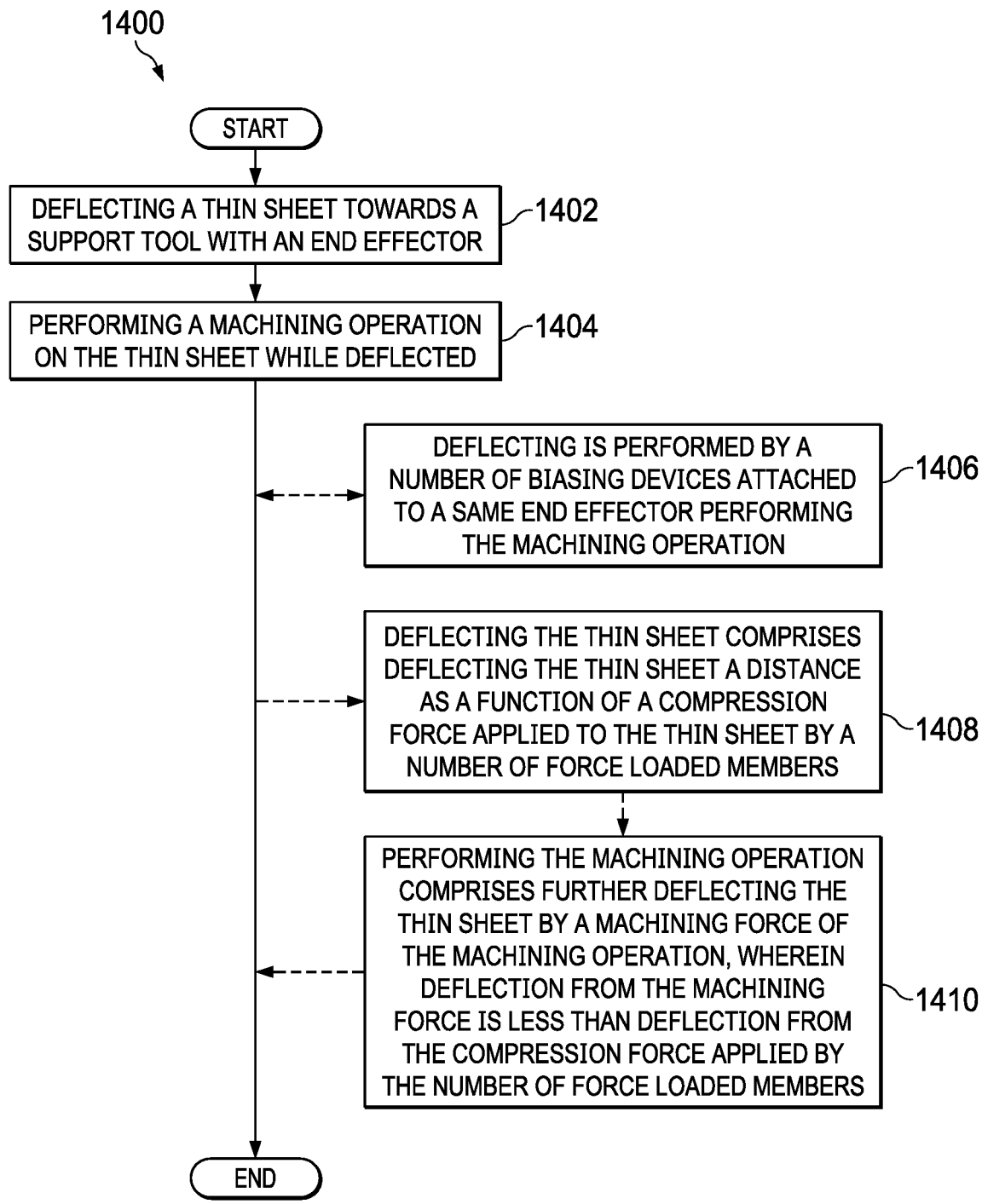
FIG. 14 is an illustration of a flowchart of a method of reducing spring back of a thin sheet during a machining operation in accordance with an illustrative embodiment.

Turning now to FIG. 14, an illustration of a flowchart of a method of reducing spring back of a thin sheet during a machining operation is depicted in accordance with an illustrative embodiment. Method 1400 may be implemented in manufacturing environment 102 of FIG. 1 using machining system 100. Method 1400 may be implemented using machining system 200 of FIGS. 2 and 3. Method 1400 may be implemented using machining system 400 of FIGS. 4-5. Method 1400 may be implemented in manufacturing environment 605 using machining system 600 of FIGS. 6-11. Method 1400 may be implemented using machining system 1200 of FIG. 12.

Method 1400 deflects the thin sheet towards a support tool with an end effector (operation 1402). Method 1400 performs the machining operation on the thin sheet while deflected (operation 1404). Afterwards the method terminates.

In some illustrative examples, deflecting is performed by a number of biasing devices attached to a same end effector performing the machining operation (operation 1406). In some illustrative examples, the number of biasing devices is part of a spring back control system of the end effector.

In some illustrative examples, deflecting the thin sheet comprises deflecting the thin sheet a distance as a function of a compression force applied to the thin sheet by a number of force loaded members (operation 1408). The compression force applied is sufficient to temporarily deflect the thin sheet and lower than a force to permanently deflect the thin sheet.

In some illustrative examples, performing the machining operation comprises further deflecting the thin sheet by a machining force of the machining operation, wherein deflection from the machining force is less than deflection from the compression force applied by the number of force loaded members (operation 1410). When the machining operation perforates the thin sheet and the machining force is no longer applied to the thin sheet, the spring back of the thin sheet is less because the thin sheet is still deflected by the compression force.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, in method 1300, operations 1308 through 1322 may be optional. As another example, in method 1400, operations 1406 through 1410 may be optional.

Figure 15:
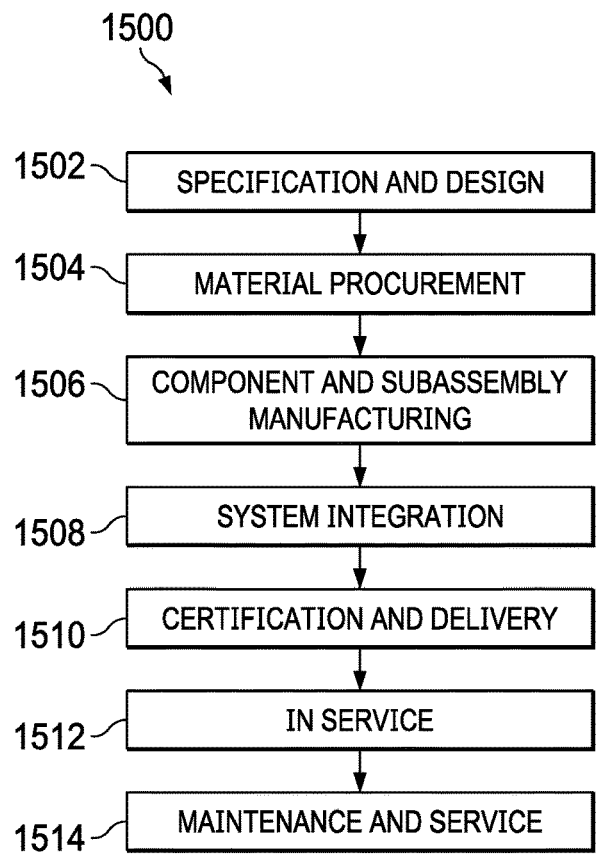
FIG. 15 is an illustration of an aircraft manufacturing and service method in a form of a block diagram in accordance with an illustrative embodiment.
Figure 16:
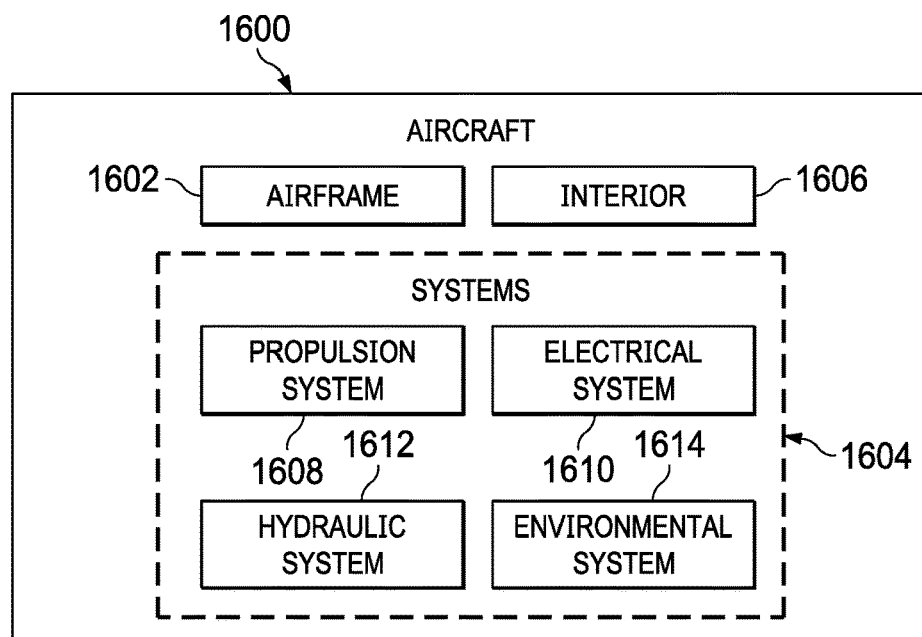
FIG. 16 is an illustration of an aircraft in a form of a block diagram in which an illustrative embodiment may be implemented.

Illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, or other maintenance and service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 of FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during at least one of component and subassembly manufacturing 1506, system integration 1508, or maintenance and service 1514 of FIG. 15. For example, machining system 100 with spring back control system 106 may be used during component and subassembly manufacturing 1506 to form component 162. As another illustrative example, machining system 100 with spring back control system 106 may be used to form a replacement component for use in maintenance and service 1514. Machining system 100 may be used to manufacture portions of aircraft 1600 such as airframe 1602 or portions of interior 1606.

The illustrative examples present machining systems and methods configured to reduce spring back following a machining operation. The illustrative examples provide a spring back control system configured to apply a compression force to a sheet. By applying the compression force to the sheet, a region of compressive force is formed. By performing a machining operation in the region of compressive force, spring back following completion of a machining operation is reduced or eliminated. By reducing or eliminating spring back, the quality of machined areas, such as holes or slots, is improved. By reducing or eliminating spring back, a risk to the machining tool is reduced.

By incorporating the spring back control system into the machining system, at least one of the complexity, the time, or the cost of securing of the sheet to the support tool may be reduced. For example, by applying a compression force to the sheet using the spring back control system, adhesive may not be used to secure the sheet to the support tool. As another example, by applying a compression force to the sheet using the spring back control system, additional mechanical or vacuum attachments to the support tool may not be used.

In some illustrative examples, a number of biasing devices apply a load to a thin sheet. By applying the load to the thin sheet, the thin sheet may reversibly deflect towards a support tool. After applying the load to the thin sheet, a machining operation is completed on the thin sheet. In some illustrative examples, the load is applied to the thin sheet prior to performing the machining operation. When the sheet is deflected prior to the machining operation, the location of a resulting feature created by the machining operation is desirably located. Deflecting the thin sheet prior to completing the machining operation reduces the spring back of the machining operation.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling spring back of a sheet of material following a machining operation using a machining system, the method comprising:
   forming a region of applied compressive force on the sheet of material by applying a compression force to the sheet using a spring back control system of the machining system, the spring back control system comprising a number of force generators coupled to carriages, coupled to an end effector and restricting an orientation of a direction of force of the force generators, the end effector supporting a machining tool between the number of force generators moveably both parallel and perpendicular to the direction of force of the number of force generators, the number of force generators each comprising, respectively, a force adjuster connected to a linear bearing within a linear force generator connected to a center of a force loaded member of a number of force loaded members contacting a surface of the sheet of material before the machining tool, each force loaded member of the number of force loaded members comprising a material contact surface contacting the surface of the sheet;
   completing a machining operation through the region of the surface of the sheet using the machining tool while applying the compression force to the sheet;
   moving, independently of the number of force generators and parallel and perpendicular to the direction of force of the number of force generators, the machining tool relative to the surface of the sheet while maintaining contact of each material contact surface of each of the number of force loaded members with the surface of the sheet; and
   rolling each force loaded member across and in contact with the surface of the sheet as the machining tool is moved relative to the surface of the sheet.

2. A machining system that comprises:
   an end effector;
   a machining tool connected to the end effector; and
   a spring back control system connected to the end effector, wherein the spring back control system comprises a number of force generators each connected, respectively, to a carriage configured to control a direction of force of each force generator, wherein each force generator comprises, respectively, a force adjuster connected to a linear bearing within a linear force generator connected to a center of a force loaded member of a number of force loaded members coupled to the number of force generators, wherein the machining tool is configured to be independently moveable parallel and perpendicular to the direction of force of each force loaded member of the number of force loaded members that are each connected, respectively, to a material contact surface configured to remain in contact with a sheet of material despite a movement of the machining tool.

3. The machining system of claim 2, wherein:
the material contact surface is a roller; and
each force loaded member of the number of force loaded members is associated with a respective force generator of the number of force generators that is a spring that surrounds the linear bearing.

4. The machining system of claim 2, wherein multiple force generators of the number of force generators are coupled to a single force loaded member of the number of force loaded members.

5. The machining system of claim 2, wherein each of the number of force loaded members further comprises a linear bearing and a carriage.

6. The machining system of claim 2, wherein the machining tool comprises a drill bit.

7. The machining system of claim 2, wherein the machining tool is independently moveable parallel to application of compression force by the spring back control system.

8. The machining system of claim 2, wherein each force loaded member of the number of force loaded members is configured to apply compression force to form a region of applied compressive force.

9. The machining system of claim 2, wherein the number of force generators is configured to provide a compressive force sufficient to deflect a thin sheet towards a support tool.

10. The machining system of claim 9, wherein the compressive force is greater than a deflection from machining force provided by the machining tool.

11. The machining system of claim 2, wherein the machining tool is moveable relative to a surface of a sheet while maintaining contact of each material contact surface of each of the number of force loaded members with the surface of the sheet.

12. A machining system that comprises:
an end effector;
a machining tool connected to the end effector;
a spring back control system connected to the end effector, wherein the spring back control system comprises:
a number of force generators each connected, respectively, to a carriage connected to the end effector and configured to control a direction of force of the force generators, wherein each force generator in the number of force generators comprises, respectively:
a force adjuster;
a linear bearing connected to the force adjuster;
a force load member connected to the linear bearing and configured to apply a compression force that forms a region of applied compressive force;
a linear force generator that surrounds the linear bearing and connects to a center of the force loaded member, wherein the machining tool is configured to be independently moveable parallel and perpendicular to the direction of force of the number of force.

13. The machining system of claim 12, wherein the machining tool is independently moveable relative to the number of linear force generators in a first direction parallel to the number of linear force generators, the machining tool positioned to perform a machining operation within the region.

14. The machining system of claim 12, wherein the number of force loaded members is each equidistant from the machining tool.

15. The machining system of claim 12, wherein the number of linear force generators comprises at least one of a number of springs or a number of pneumatic cylinders.

16. The machining system of claim 12, wherein the machining tool is independently moveable in a second direction perpendicular to the number of linear force generators.

17. The machining system of claim 12, wherein machining tool comprises a drill bit having an axis parallel to the number of linear force generators.

18. The machining system of claim 12, wherein the number of force generators is configured to provide a deflection from the compressive force greater than a deflection from machining force provided by the machining tool.

19. The machining system of claim 12, wherein the respective carriage bracket the machining tool.

20. The machining system of claim 12, wherein the machining tool is configured to move relative to a surface of a sheet with each material contact surface of each of the number of force loaded members in contact with the surface of the sheet.

* * * * *

UNITED STATES PATENT AND TRADEMARK OFFICE
CERTIFICATE OF CORRECTION

| | | |
|---|---|---|
| PATENT NO. | : 12,208,453 B2 | Page 1 of 1 |
| APPLICATION NO. | : 17/199353 | |
| DATED | : January 28, 2025 | |
| INVENTOR(S) | : Garth Tristan Irvine, Claudio Zubin and Darren G. Mitchell | |

It is certified that error appears in the above-identified patent and that said Letters Patent is hereby corrected as shown below:

In the Claims

Column 20, Line 45, correct "force the sheet;" to read -- force to the sheet --
Column 22, Lines 32 and 33, correct "wherein machining" to read -- wherein the machining --

Signed and Sealed this
Eighteenth Day of March, 2025

Coke Morgan Stewart
*Acting Director of the United States Patent and Trademark Office*